(12) United States Patent
Ko et al.

(10) Patent No.: US 11,153,867 B2
(45) Date of Patent: Oct. 19, 2021

(54) METHOD AND APPARATUS FOR TRANSMITTING AND RECEIVING SIGNAL IN COMMUNICATION SYSTEM

(71) Applicant: ELECTRONICS AND TELECOMMUNICATIONS RESEARCH INSTITUTE, Daejeon (KR)

(72) Inventors: Young Jo Ko, Daejeon (KR); Gi Yoon Park, Daejeon (KR); Ok Sun Park, Daejeon (KR); Seung Kwon Baek, Daejeon (KR); Woo Ram Shin, Daejeon (KR); Chan Ho Yoon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 36 days.

(21) Appl. No.: 16/411,306

(22) Filed: May 14, 2019

(65) Prior Publication Data

US 2019/0364553 A1    Nov. 28, 2019

(30) Foreign Application Priority Data

May 28, 2018    (KR) .................. 10-2018-0060492

(51) Int. Cl.
*H04W 72/04*    (2009.01)
*H04L 1/00*    (2006.01)
(Continued)

(52) U.S. Cl.
CPC ......... *H04W 72/044* (2013.01); *H04L 1/0034* (2013.01); *H04L 1/1819* (2013.01); *H04W 72/042* (2013.01); *H04W 72/1273* (2013.01)

(58) Field of Classification Search
CPC ............ H04B 7/0456; H04W 72/1268; H04W 72/042; H04W 72/044; H04W 72/1273; H04L 1/1819; H04L 5/0019
See application file for complete search history.

(56) References Cited

U.S. PATENT DOCUMENTS 7,924,953 B2    4/2011    Choi et al.
8,023,531 B2    9/2011    Shimomura et al.
(Continued)

FOREIGN PATENT DOCUMENTS

KR    10-2009-0074988 A    7/2009

OTHER PUBLICATIONS

Niklas A. Johansson et al. "Radio Access for Ultra-Reliable and Low-Latency 5G Communications", IEEE ICC 2015—Workshop on 5G & Beyond—Enabling Technologies and Applications.

*Primary Examiner* — Omer S Mian
(74) *Attorney, Agent, or Firm* — LRK Patent Law Firm

(57) ABSTRACT

A method and apparatus for transmitting and receiving signal in communication system. A method of a base station includes: configuring frequency spreading sequences each of which corresponds to a transmission starting time point; configuring time spreading sequences each of which corresponds to a terminal; and transmitting information on the frequency spreading sequences and the time spreading sequences to a plurality of terminals, wherein one of the frequency spreading sequences and one of the time spreading sequences are assigned to each of the plurality of terminals.

18 Claims, 12 Drawing Sheets

(51) Int. Cl.
*H04W 72/12* (2009.01)
*H04L 1/18* (2006.01)

(56) References Cited

U.S. PATENT DOCUMENTS

| | | |
|---|---|---|
| 8,693,305 B2 | 4/2014 | Laroia et al. |
| 2004/0081227 A1 | 4/2004 | Lim et al. |
| 2011/0243197 A1 | 10/2011 | Atarashi et al. |
| 2015/0172022 A1* | 6/2015 | Guo .................. H04L 5/0053 370/329 |
| 2016/0285595 A1 | 9/2016 | Chen et al. |
| 2017/0099078 A1* | 4/2017 | Lyu ..................... H04B 1/69 |
| 2017/0111887 A1* | 4/2017 | Hong ................ H04B 17/345 |
| 2017/0366328 A1* | 12/2017 | Seo .................... H04L 5/0055 |
| 2018/0123765 A1* | 5/2018 | Cao .................... H04L 1/1822 |
| 2019/0013912 A1* | 1/2019 | Tomeba ................ H04B 7/04 |
| 2019/0159193 A1* | 5/2019 | Zhang ................ H04J 13/0048 |

* cited by examiner

FIG. 11

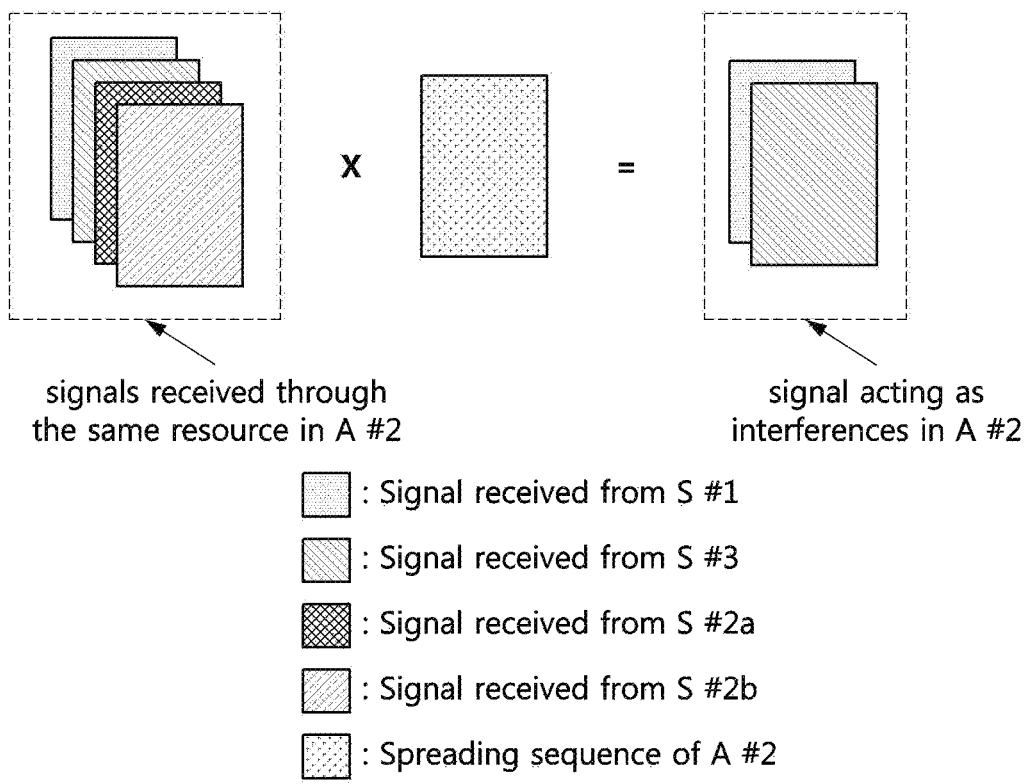

signals received through the same resource in A #2 signal acting as interferences in A #2

▨ : Signal received from S #1
▨ : Signal received from S #3
▨ : Signal received from S #2a
▨ : Signal received from S #2b
▨ : Spreading sequence of A #2

FIG. 12

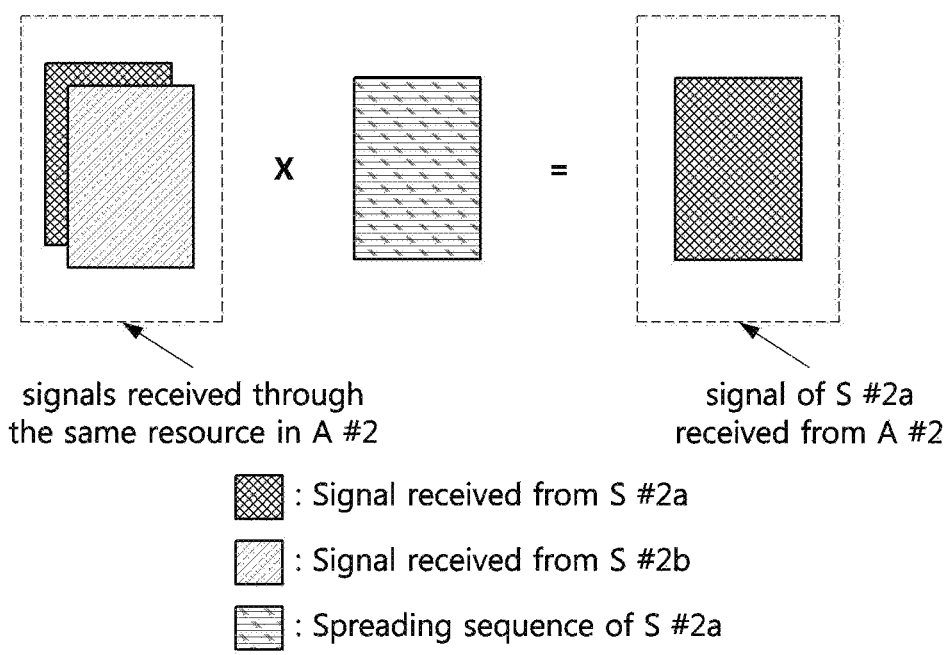

signals received through the same resource in A #2 signal of S #2a received from A #2

▨ : Signal received from S #2a
▨ : Signal received from S #2b
▨ : Spreading sequence of S #2a signals received through the same resource in A #2 signal of S #2b received from A #2

▨ : Signal received from S #2a

▨ : Signal received from S #2b

▨ : Spreading sequence of S #2b

METHOD AND APPARATUS FOR TRANSMITTING AND RECEIVING SIGNAL IN COMMUNICATION SYSTEM

CROSS-REFERENCE TO RELATED APPLICATION

This application claims priority to Korean Patent Application No. 10-2018-0060492, filed on May 28, 2018 in the Korean Intellectual Property Office (KIPO), the entire content of which is hereby incorporated by reference.

BACKGROUND

1. Technical Field

The present disclosure relates to a technique for transmitting and receiving signals in a communication system, and more particularly, to a technique for transmitting and receiving signals, which satisfies ultra-reliability and low-latency requirements.

2. Description of Related Art

A $5^{th}$ generation (5G) communication system (e.g., a new radio (NR) communication system) using a frequency band (e.g., frequency band above 6 GHz) higher than a frequency band (e.g., frequency band below 6 GHz) of a $4^{th}$ generation (4G) communication system (e.g., a long term evolution (LTE) communication system or a LTE-advanced (LTE-A) communication system) as well as the frequency band of the 4G communication system has been considered for processing of wireless data which has rapidly increased since commercialization of the 4G communication system. The 5G communication system can support enhanced mobile broadband (eMBB), ultra-reliable and low-latency communication (URLLC), and massive machine type communication (mMTC).

In the ultra-reliable low-latency communication system having very high requirements, the ultra-reliability requirement may be defined as 'packet transmission success rate=1-$10^{-9}$', and the low-latency requirement may be defined as 'end-to-end latency=0.25 ms'. Since current signal transmission and reception techniques including the 5G communication do not satisfy such the ultra-reliability and low-latency requirements, signal transmission and reception techniques satisfying the above requirements are needed.

SUMMARY

Accordingly, embodiments of the present disclosure provide a method and an apparatus for transmitting and receiving signals in a communication system, which satisfy ultra-reliability and low-latency requirements.

In order to achieve the objective of the present disclosure, a method of a base station comprises: configuring frequency spreading sequences each of which corresponds to a transmission starting time point; configuring time spreading sequences each of which corresponds to a terminal; and transmitting information on the frequency spreading sequences and the time spreading sequences to a plurality of terminals, wherein one of the frequency spreading sequences and one of the time spreading sequences are assigned to each of the plurality of terminals.

Here, the transmission starting time point may be an arbitrary symbol in a subframe, the frequency spreading sequences may be configured to be orthogonal to each other at a same transmission starting time point, and the frequency spreading sequences may be used for frequency-axis spreading.

Here, the time spreading sequences may be configured to be orthogonal to each other, and the time spreading sequences may be used for time-axis spreading.

Here, the method may further comprise: receiving signals from the plurality of terminals through time-frequency resources; and performing despreading on the signals by using a frequency spreading sequence assigned to a first terminal among the plurality of terminals so as to obtain despread signals.

Here, the method may further comprise, when the despread signals include a first signal of the first terminal and a second signal of a second signal among the plurality of terminals, obtaining the first signal by performing despreading on the despread signals by using a first time spreading sequence for the first terminal, wherein the first time spreading sequence is orthogonal to a second time spreading sequence for the second terminal.

Here, the first signal of the first terminal and the second signal of the second terminal may be transmitted in a grant-free scheme.

Here, the information on the frequency spreading sequence and the time spreading sequence may be transmitted through a downlink control information (DCI).

Here, a time-frequency resource through which the DCI is transmitted may be allocated based on a link adaptation scheme, and the link adaptation scheme may be determined based on a signal-to-noise ratio (SNR) and an interference-to-noise ratio (INR) which are obtained from at least one of the plurality of terminals.

In order to achieve the objective of the present disclosure, a method of a first terminal comprises: receiving, from a base station, information on a frequency spreading sequence for a transmission starting time point and a first time spreading sequence for the first terminal; generating a signal by performing spreading for a transport block (TB) based on the first time spreading sequence and the frequency spreading sequence; and transmitting the signal to the base station.

Here, the transmission starting time point may be an arbitrary symbol in a subframe, the frequency spreading sequence may be configured to be orthogonal to another frequency spreading sequence at the transmission staring time point, and the frequency spreading sequence may be used for frequency-axis spreading.

Here, the first time spreading sequence may be configured to be orthogonal to a time spreading sequence for another terminal, and the first time spreading sequence may be used for time-axis spreading.

Here, the signal may be transmitted based on a grant-free scheme.

Here, the information on the frequency spreading sequence and the first time spreading sequence may be received through a downlink control information (DCI).

Here, a time-frequency resource through which the DCI is transmitted may be allocated by the base station based on a link adaptation scheme, and the link adaptation scheme may be determined based on a signal-to-noise ratio (SNR) and an interference-to-noise ratio (INR) which are measured by the first terminal.

Here, the time-frequency resource through which the DCI is transmitted may be monitored through a blind detection operation.

In order to achieve the objective of the present disclosure, a first terminal comprises: a processor and a memory storing at least one instruction executed by the processor, wherein the at least one instruction is configured to: receive, from a base station, information on a frequency spreading sequence for a transmission starting time point and a first time spreading sequence for the first terminal; generate a signal by performing spreading on a transport block (TB) based on the first time spreading sequence and the frequency spreading sequence; and transmit the signal to the base station.

Here, the transmission starting time point may be an arbitrary symbol in a subframe, the frequency spreading sequence may be configured to be orthogonal to another frequency spreading sequence at the transmission staring time point, and the frequency spreading sequence may be used for frequency-axis spreading.

Here, the first time spreading sequence may be configured to be orthogonal to a time spreading sequence for another terminal, and the first time spreading sequence may be used for time-axis spreading.

Here, the information on the frequency spreading sequence and the first time spreading sequence may be received through a downlink control information (DCI), a time-frequency resource through which the DCI is transmitted may be allocated by the base station based on a link adaptation scheme, and the link adaptation scheme may be determined based on a signal-to-noise ratio (SNR) and an interference-to-noise ratio (INR) which are measured by the first terminal.

Here, the time-frequency resource through which the DCI is transmitted may be monitored through a blind detection operation.

According to the embodiments of the present disclosure, the base station may configure orthogonal frequency spreading sequences for respective transmission starting time points, configure orthogonal time spreading sequences for respective terminal, and inform the frequency spreading sequences and the time spreading sequences to terminals. Even when the terminals transmit signals through partially or entirely overlapped time-frequency resources, the base station may use the frequency spreading sequences and the time spreading sequences to identify signals of the respective terminals. Therefore, the requirements of ultra-reliability and low-latency can be satisfied in the communication system.

Also, the communication node (e.g., base station or terminal) may measure interferences, noises and received signal strengths by using the spreading sequences, and perform link adaptation based on the measured interferences, noises, and received signal strengths, so that the performance of the communication system can be improved.

BRIEF DESCRIPTION OF DRAWINGS

Embodiments of the present disclosure will become more apparent by describing in detail embodiments of the present disclosure with reference to the accompanying drawings, in which:

FIG. 11 is a conceptual diagram illustrating a first embodiment of an interference/noise measurement method in a communication system;

FIG. 12 is a conceptual diagram illustrating a first embodiment of a signal strength measurement method in a communication system;

DETAILED DESCRIPTION

Figure 1:
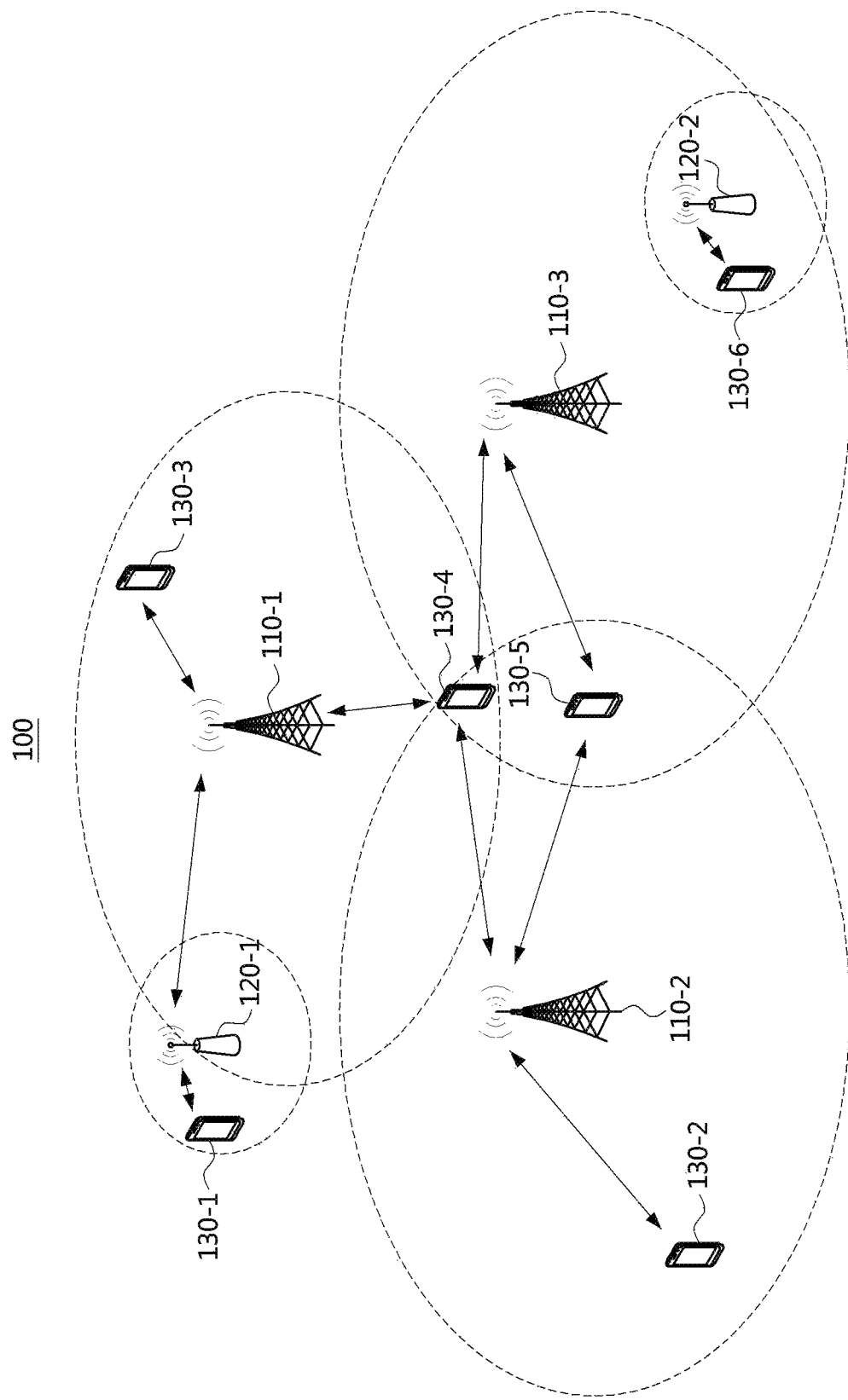
FIG. 1 is a conceptual diagram illustrating a first embodiment of a communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

A communication system to which embodiments according to the present disclosure are applied will be described. However, the communication systems to which embodiments according to the present disclosure are applied are not restricted to what will be described below. That is, the embodiments according to the present disclosure may be applied to various communication systems. Here, the term 'communication system' may be used with the same meaning as the term 'communication network'.

FIG. 1 is a conceptual diagram illustrating a first embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4G communication (e.g., long term evolution (LTE), LTE-advanced (LTE-A)), 5G communication (e.g., new radio (NR)), or the like. The 4G communication may be performed in a frequency band below 6 GHz, and the 5G communication may be performed in a frequency band above 6 GHz as well as the frequency band below 6 GHz.

For example, for the 4G communication and the 5G communication, the plurality of communication nodes may support code division multiple access (CDMA) technology, wideband CDMA (WCDMA) technology, time division multiple access (TDMA) technology, frequency division multiple access (FDMA) technology, orthogonal frequency division multiplexing (OFDM) technology, filtered OFDM technology, cyclic prefix OFDM (CP-OFDM) technology, discrete Fourier transform-spread-OFDM (DFT-s-OFDM) technology, single carrier FDMA (SC-FDMA) technology, non-orthogonal multiple access (NOMA) technology, generalized frequency division multiplexing (GFDM) technology, filter band multi-carrier (FBMC) technology, universal filtered multi-carrier (UFMC) technology, space division multiple access (SDMA) technology, or the like.

Also, the communication system 100 may further comprise a core network. When the communication system supports the 4G communication, the core network may include a serving gateway (S-GW), a packet data network (PDN) gateway (P-GW), a mobility management entity (MME), and the like. When the communication system 100 supports the 5G communication, the core network may include an access and mobility management function (AMF), a user plane function (UPF), a session management function (SMF), and the like.

Meanwhile each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
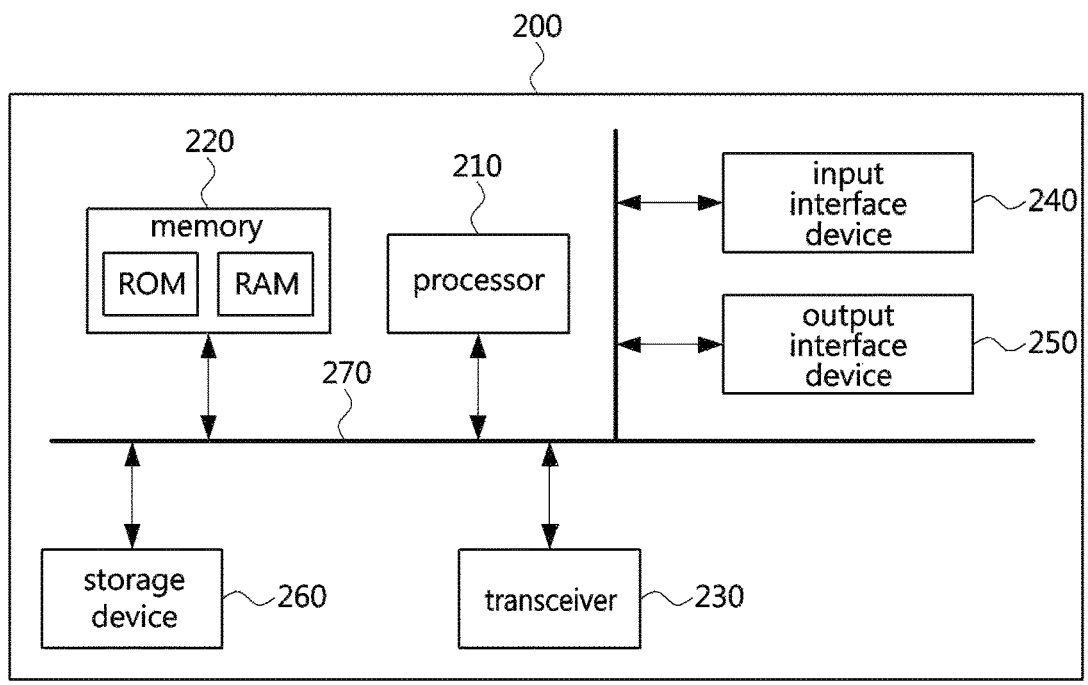
FIG. 2 is a block diagram illustrating a first embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, or the like. Also, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for transmitting and receiving a signal, which satisfy ultra-reliability and low-latency requirements, will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

In a downlink transmission procedure of a communication system, a base station may transmit a scheduling command (e.g., information on a downlink resource scheduled by the base station) to a terminal, and transmit downlink data (e.g., downlink packet) to the terminal by using a resource indicated by the scheduling command. In an uplink transmission procedure of the communication system, the terminal may transmit a scheduling request (SR) to the base station when uplink data is generated, receive a scheduling command from the base station, and transmit a buffer status report (BSR) to the base station. Thereafter, the terminal may receive an additional scheduling command (e.g., uplink (UL) grant) from the base station, and may transmit the uplink data to the base station based on the additional scheduling command.

A transmission interval of a packet (e.g., data) in the communication system may be defined as a transmission time interval (TTI). The TTI may indicate a duration from a transmission starting time point of a packet to a transmission ending time point of the packet. The TTI may be 1 millisecond (ms). The transmission of the packet may be started at a preconfigured time point (hereinafter referred to as a 'transmission starting time point'), and the transmission starting time points may exist at a constant time interval. The time interval between the transmission starting time points may be the same as the TTI. One packet may be transmitted within one TTI. In the communication system, the transmission starting time points may be the same regardless of the terminal. For example, in the downlink transmission procedure, the base station may transmit different packets to a plurality of terminals at the same transmission starting time point. In the uplink transmission procedure, a plurality of terminals may transmit different packets to the base station at the same transmission starting time point.

Figure 3:
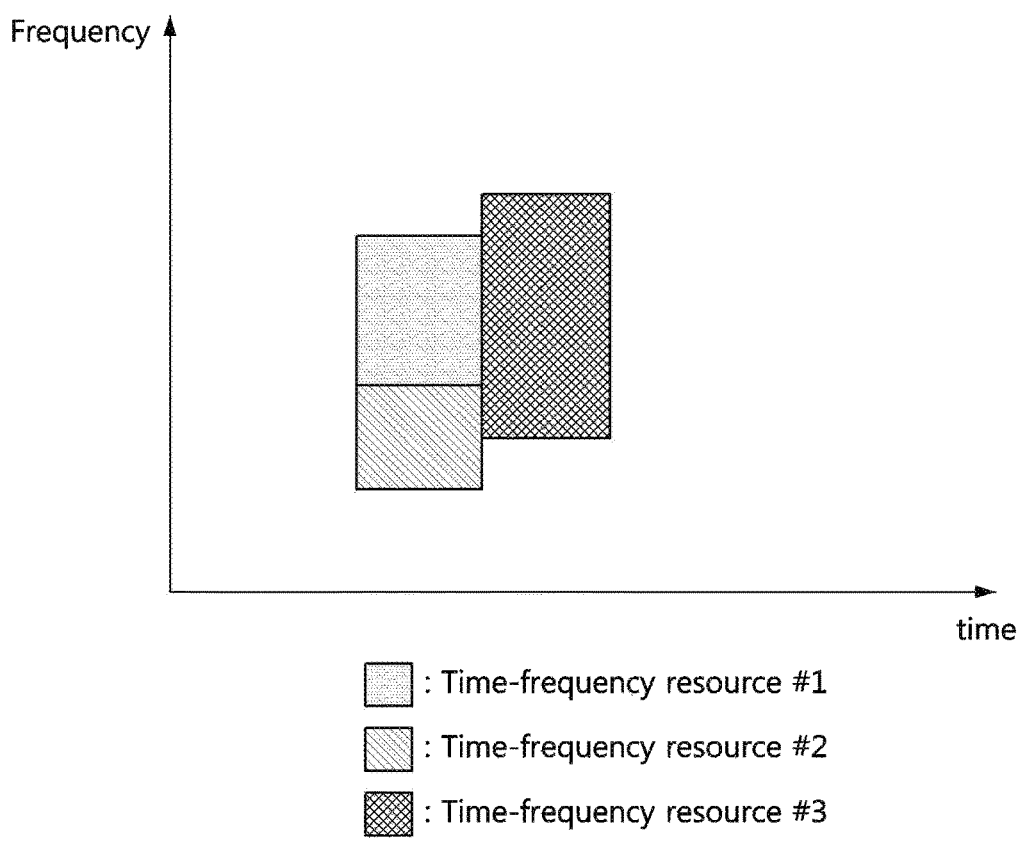
FIG. 3 is a conceptual diagram illustrating a first embodiment of time-frequency resources used for communications in a communication system.

FIG. 3 is a conceptual diagram illustrating a first embodiment of time-frequency resources used for communications in a communication system.

Referring to FIG. 3, a time-frequency resource #1 may be a resource used for communication of a communication node #1, a time-frequency resource #2 may be a resource used for communication of a communication node #2, and a time-frequency resource #3 may be a resource used for communication of a communication node #3. Each of the communication nodes #1 to #3 may be a base station, a terminal, or the like. The communication nodes #1 and #2 may perform communications using different frequency resources in the same time period. The communication node #3 may perform communications in a time period different from that of the communication nodes #1 and #2.

The time periods used for communication may be completely overlapped in the communication nodes (e.g., communication nodes #1 and #2). Alternatively, the time periods used for communication may not overlap in the communication nodes (e.g., between the communication nodes #1 and #3 or between the communication nodes #2 and #3).

A hybrid automatic repeat request (HARQ) based retransmission procedure may be performed in the communication system. For example, the terminal may transmit an HARQ acknowledgment (ACK) to the base station when a packet received from the base station is successfully decoded. On the other hand, the terminal may transmit a HARQ negative ACK (NACK) to the base station when decoding of a packet received from the base station fails. When the HARQ NACK is received from the terminal, the base station may retransmit the packet to the terminal.

Meanwhile, in the communication system, the ultra-reliability requirement may be defined as 'packet transmission success rate=$1-10^{-9}$', and the low-latency requirement may be defined as 'end-to-end latency=0.25 ms'. In order to satisfy the ultra-reliability and low-latency requirements, the following transmission schemes may be used.

Immediate transmission scheme: minimize the interval between the transmission starting time points. For example, configure the time interval between the transmission starting time points to be less than 1 ms.

Grant-free transmission scheme (e.g., autonomous transmission scheme): The terminal may directly transmit uplink data to the base station without receiving a UL grant.

Continuous transmission scheme: initial data and retransmission data are transmitted without a time interval. Accordingly, reliability of data transmission can be improved, and a receiving communication node can decode the data quickly.

Device-to-Device (D2D) transmission scheme: direct communications between terminals are performed without relaying of a base station.

Multiple Access Scheme

In order to satisfy the ultra-reliability and low-latency requirements in the communication system, a quality of a signal (e.g., signal to interference to noise ratio (SINR)) received at a receiving communication node should be sufficiently high. Since a capacity of a power amplifier in a communication node (e.g., a terminal) is limited, it is necessary to maintain a long transmission time of one packet so that energy used per packet may increase. When the communication node starts packet transmission as fast as possible, all of the ultra-reliability and low-latency requirements can be satisfied by maximizing the usable energy within a time range allowed by the low-latency requirement. To this end, the transmission starting time point of the packet may be set to an arbitrary symbol among symbols constituting a subframe. For example, the transmission starting time point of the packet may be configured as follows.

Figure 4:
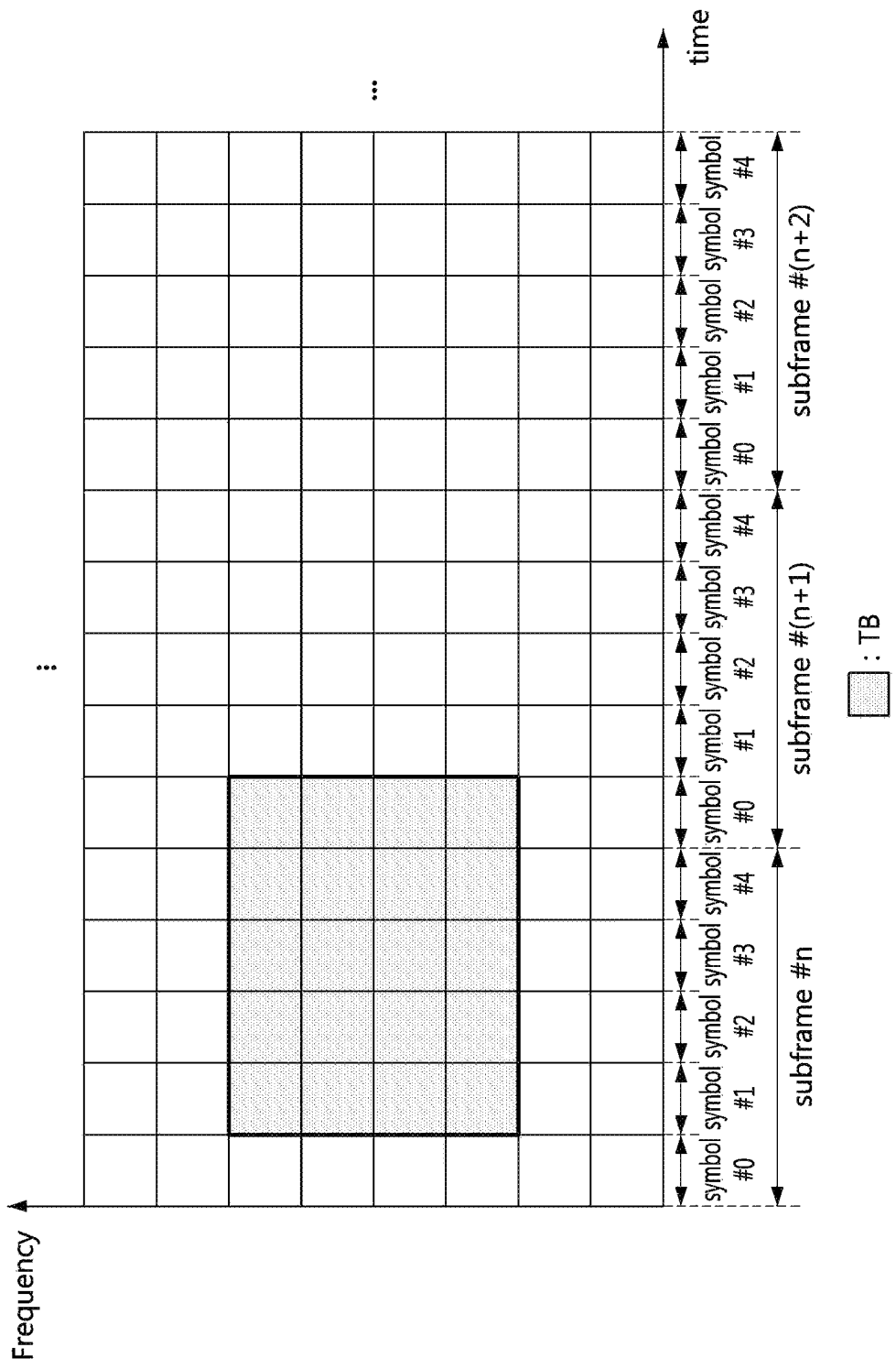
FIG. 4 is a conceptual diagram illustrating a second embodiment of time-frequency resources used for communications in a communication system.

FIG. 4 is a conceptual diagram illustrating a second embodiment of time-frequency resources used for communications in a communication system.

Referring to FIG. 4, a subframe may include a plurality of symbols. For example, the subframe may include 5 symbols (e.g., symbols #0 to #4). The transmission of the packet (e.g., a transport block (TB) including the packet) may start at an arbitrary symbol among the symbols #0 to #4 in the subframe. For example, the transmission starting time point of the TB may be the symbol #1 in the subframe.

On the other hand, a transmission scheme for minimizing interferences may be used to satisfy the ultra-reliability requirement. Spreading-based transmission schemes may be used to randomize or average interferences between terminals as follows.

Frequency spreading-based transmission scheme: multiple access scheme using one-dimensional spreading in the frequency axis (i.e., frequency-axis spreading)

Time spreading-based transmission scheme: multiple access scheme using one-dimensional spreading in the time axis (i.e., time-axis spreading)

Figure 5:
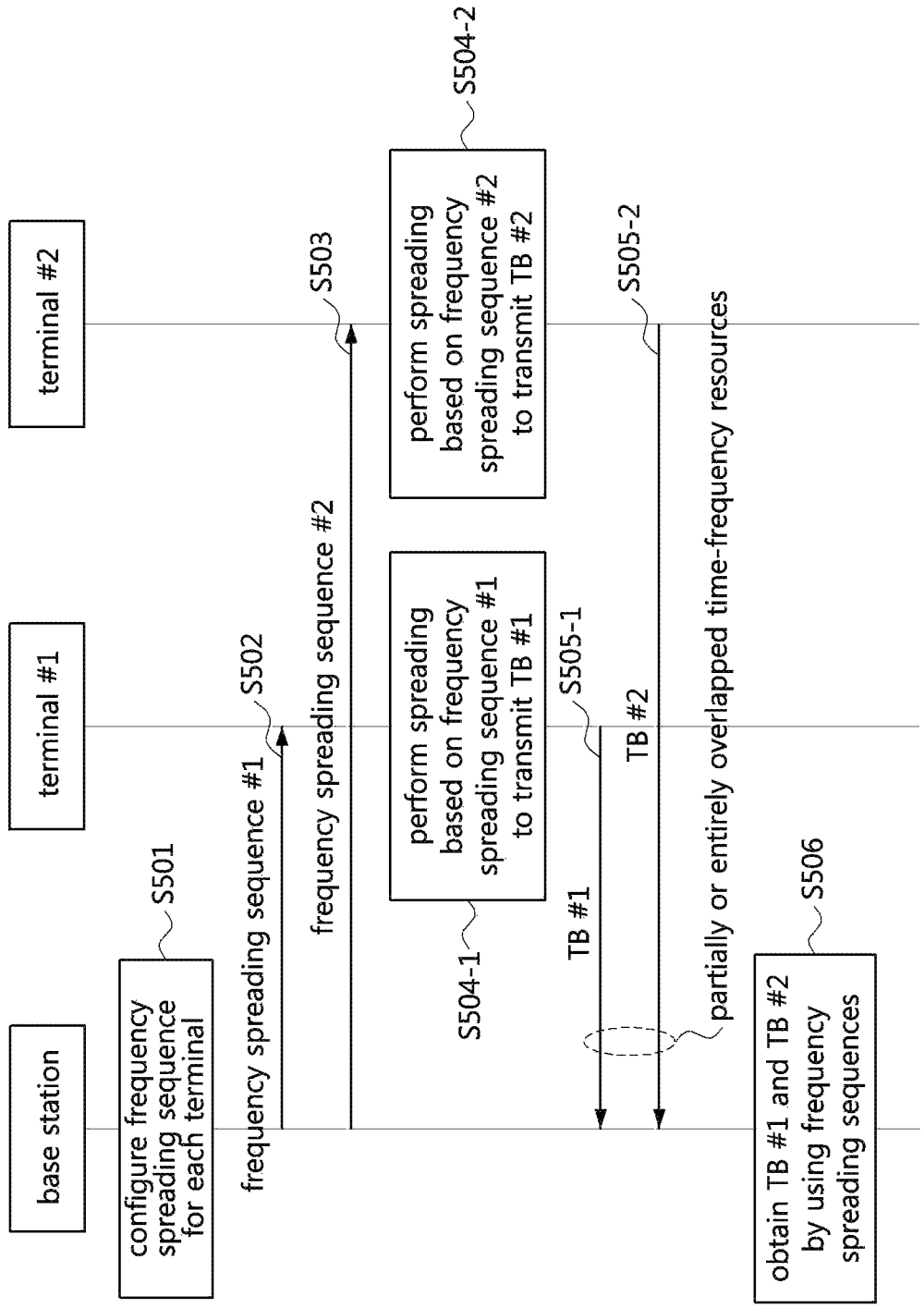
FIG. 5 is a sequence chart illustrating a first embodiment of a frequency spreading-based transmission scheme in a communication system.

Time-frequency spreading-based transmission scheme: multiple access scheme using two-dimensional spreading in the time and frequency axes Frequency Spreading Based Transmission Scheme FIG. 5 is a sequence chart illustrating a first embodiment of a frequency spreading-based transmission scheme in a communication system.

Referring to FIG. 5, a communication system may include a base station, a terminal #1, a terminal #2, and the like. The terminals #1 and #2 may belong to coverage of the base station, and the communications between the base station and each of the terminals #1 and #2 may be performed. For example, the base station may be the base station 110-1, 110-2, 110-3, 120-1, or 120-2 shown in FIG. 1, and each of the terminals #1 and #2 may be the terminal 130-1, 130-2, 130-3, 130-4, 130-5, or 130-6. Further, each of the base station, the terminal #1 and the terminal #2 may be configured to be the same as or similar to the communication node 200 shown in FIG. 2.

A time-frequency resource #1 used for communications between the base station and the terminal #1 may be the same as a time-frequency resource #2 used for communications between the base station and the terminal #2. Alternatively, the time-frequency resource #1 may be partially overlapped with the time-frequency resource #2. In this case, since interferences occur between the terminals, the frequency spreading-based transmission scheme may be used to randomize or minimize the interferences.

For example, the base station may configure frequency spreading sequences used for one-dimensional spreading in the frequency axis (S501). In the step S501, a frequency spreading sequence #1 for the terminal #1 and a frequency spreading sequence #2 for the terminal #2 may be configured, and the frequency spreading sequence #1 may be orthogonal to the frequency spreading sequence #2. The base station may notify the frequency spreading sequence #1 to the terminal #1 (S502), and may notify the frequency spreading sequence #2 to the terminal #2 (S503). For example, the frequency spreading sequence may be notified to the terminal through system information, downlink control information (DCI), a signaling message (e.g., radio resource control (RRC) signaling message), or the like.

The terminal #1 may obtain the frequency spreading sequence #1 from the base station. The terminal #1 may generate a signal by performing frequency-axis spreading for a TB #1 using the frequency spreading sequence #1 (S504-1), and transmit the signal generated in the step S504-1 (e.g., the spread TB #1) to the base station using the time-frequency resource #1 (S505-1). Also, the terminal #2 may obtain the frequency spreading sequence #2 from the base station. The terminal #2 may generate a signal by performing frequency-axis spreading for a TB #2 using the frequency spreading sequence #2 (S504-2), and transmit the signal generated in the step S504-2 (e.g., the spread TB #2) to the base station using the time-frequency resource #2 (S505-2).

The base station may receive the signal (e.g., the spread TB #1) through the time-frequency resource #1 and receive the signal (e.g., the spread TB #2) through the time-frequency resource #2. Even when the time-frequency resource #1 overlaps partially or entirely with the time-frequency resource #2, the base station may obtain the TB #1 by performing despreading based on the frequency spreading sequence #1, and may obtain the TB #2 by performing despreading based on the frequency spreading sequence #2 (S506). For example, even when the TB #1 and the TB #2 are transmitted using the same symbols, the base station may obtain the TB #1 using the frequency spreading sequence #1 and may obtain the TB #2 using the frequency spreading sequence #2.

Time Spreading Based Transmission Scheme

The time spreading-based transmission scheme may be performed in the same manner as or similar to the frequency spreading-based transmission scheme. For example, in the step S501 of FIG. 5, the base station may configure time spreading sequences used for one-dimensional spreading in the time axis. For example, the base station may configure a time spreading sequence #1 for the terminal #1 and a time spreading sequence #2 for the terminal #2. The time spreading sequence #1 may be orthogonal to the time spreading sequence #2. In the step S502 of FIG. 5, the base station may notify the time spreading sequence #1 to the terminal #1, and in the step S503 of FIG. 5, the base station may notify the time spreading sequence #2 to the terminal #2.

In the steps S504-1 and S505-1 of FIG. 5, the terminal #1 may generate a signal by performing time-axis spreading for a TB #1 by using the time spreading sequence #1 received from the base station, and transmit the generated signal (e.g., the spread TB #1) to the base station by using the time-frequency resource #1. In the steps S504-2 and S505-2 of FIG. 5, the terminal #2 may generate a signal by performing time-axis spreading for a TB #2 by using the time spreading sequence #2 received from the base station, and transmit the generated signal (e.g., the spread TB #2) to the base station by using the time-frequency resource #2. When the time-frequency resource #1 is equal to the time-frequency resource #2, the base station may obtain the TB #1 using the time spreading sequence #1, and obtain the TB #2 using the time spreading sequence #2 (S506).

However, when the transmission starting time point of the terminal #1 is different from the transmission starting time point of the terminal #2, the time period of the time-frequency resource #1 may be partially overlapped with the time period of the time-frequency resource #2. For example, the time-frequency resources #1 and #2 may be configured as follows.

Figure 6:
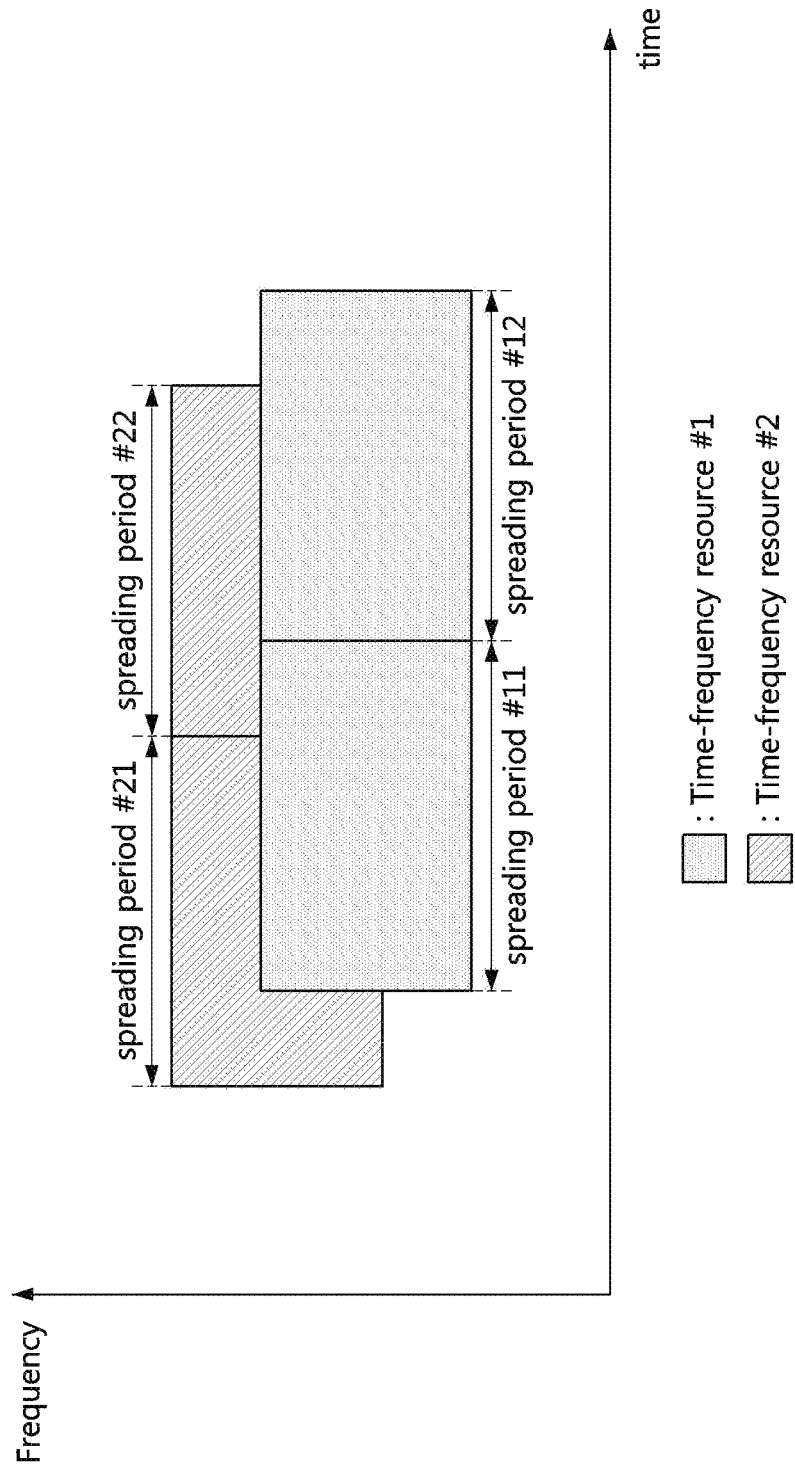
FIG. 6 is a conceptual diagram illustrating a third embodiment of time-frequency resources used for communications in a communication system.

FIG. 6 is a conceptual diagram illustrating a third embodiment of time-frequency resources used for communications in a communication system.

Referring to FIG. 6, the time period of the time-frequency resource #1 for the terminal #1 may include spreading periods #11 and #12, and the time period of the time-frequency resource #2 for the terminal #2 may include spreading periods #21 and #22. The spreading period may indicate a time period to which a time spreading sequence is applied. When the time period of the time-frequency resource #1 is partially overlapped with the time period of the time-frequency resource #2, the spreading period #11 may be partially overlapped with the spreading period #21, and the spreading period #12 may be partially overlapped with the spreading period #22. In this case, it may be difficult for the base station to identify the TB #1 received through the time-frequency resource #1 and the TB #2 received through the time-frequency resource #2.

In case that the time period of the time-frequency resource #1 and the time period of the time-frequency resource #2, which are respectively used by the terminal #1 and the terminal #2, are partially overlapped, when the time spreading-based transmission scheme is used, the signal of the terminal #1 may not be orthogonal to the signal of the terminal #2 in some spreading periods. In the following embodiments, a spreading scheme using a discrete Fourier transform (DFT) sequence as the time spreading sequence will be described. The characteristics of the DFT sequence are as follows. In particular, a k-th DFT sequence may be expressed by Equation 1 below.

$$e^{\frac{2\pi i}{N}kn}, n = 0, 1, 2, \ldots, N-1 \quad \text{[Equation 1]}$$

Referring to Equation 2 below, the k-th DFT sequence may be orthogonal to the k'-th DFT sequence.

$$u_k^T \cdot u_{k'}^* = \sum_{n=0}^{N-1} (e^{\frac{2\pi i}{N}kn})(e^{\frac{2\pi i}{N}k'n}) = \sum_{n=0}^{N-1} e^{\frac{2\pi i}{N}(k-k')n} = N\delta_{kk'} \quad \text{[Equation 2]}$$

The DFT sequence of the terminal, which has a temporal displacement, may be expressed by Equation 3 below.

$$e^{\frac{2\pi i}{N}k(n-m)}, n = 0, 1, 2, \ldots, N-1 \quad \text{[Equation 3]}$$

Referring to Equation 4 below, the k-th sequence having a temporal displacement (e.g., the k-th sequence expressed by Equation 3) may still be orthogonal to the k'-th DFT sequence.

$$u_{k,m}^T \cdot u_{k'}^* = \sum_{n=0}^{N-1} (e^{\frac{2\pi i}{N}k(n-m)})(e^{-\frac{2\pi i}{N}k'n}) = $$

$$e^{-\frac{2\pi i}{N}km} \sum_{n=0}^{N-1} e^{\frac{2\pi i}{n}(k-k')n} = e^{-\frac{2\pi i}{N}km} N\delta_{kk'} \quad \text{[Equation 4]}$$

When despreading is applied to the spreading period #11, the orthogonality between the terminal #1 and the terminal #2 may be maintained. On the other hand, when despreading is applied to the spreading period #21, the orthogonality between the terminal #1 and the terminal #2 may not be maintained. Also, when despreading is applied to the spreading period #22, the orthogonality between the terminal #1 and the terminal #2 may be maintained. On the other hand, when despreading is applied to the spreading period #12, the orthogonality between the terminal #1 and the terminal #2 may not be maintained.

Time-Frequency Spreading-Based Transmission Scheme

Figure 7:
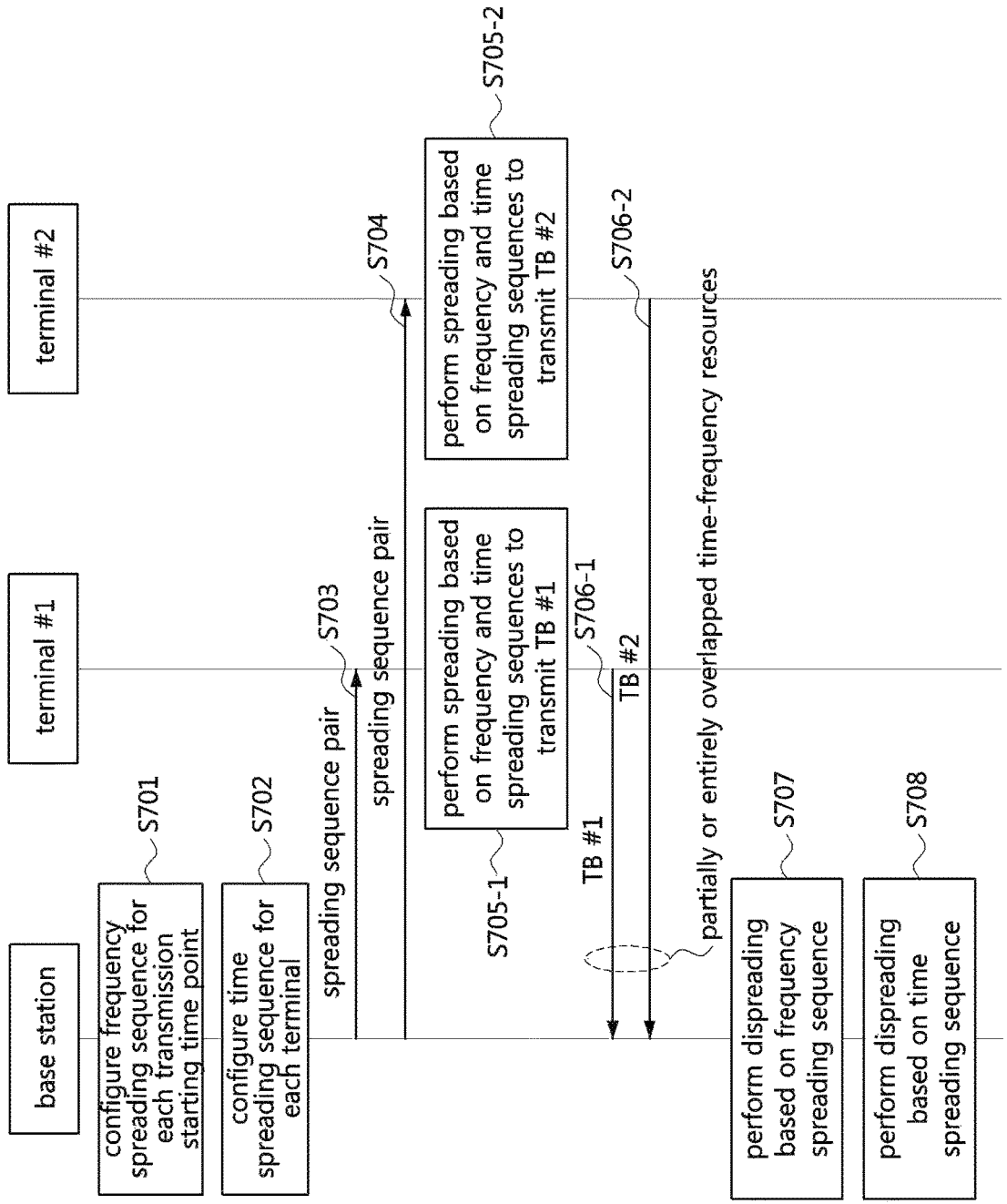
FIG. 7 is a sequence chart illustrating a first embodiment of a time-frequency spreading-based transmission scheme in a communication system.

FIG. 7 is a sequence chart illustrating a first embodiment of a time-frequency spreading-based transmission scheme in a communication system.

Referring to FIG. 7, a communication system may include a base station, a terminal #1, a terminal #2, and the like. The terminals #1 and #2 may belong to coverage of the base station, and the communications between the base station and each of the terminals #1 and #2 may be performed. For example, the base station may be the base station 110-1, 110-2, 110-3, 120-1, or 120-2 shown in FIG. 1, and each of the terminals #1 and #2 may be the terminal 130-1, 130-2, 130-3, 130-4, 130-5, or 130-6. Further, each of the base station, the terminal #1 and the terminal #2 may be configured to be the same as or similar to the communication node 200 shown in FIG. 2.

A time-frequency resource #1 used for communications between the base station and the terminal #1 may be partially or entirely overlapped with a time-frequency resource #2 used for communications between the base station and the terminal #2. In this case, since interferences occur between the terminals, the time-frequency spreading-based transmission scheme may be used to randomize or minimize the interferences.

For example, the base station may configure frequency spreading sequences used for one-dimensional spreading in the frequency axis (S701). In the step S701, the base station may configure a different frequency spreading sequence for each of transmission starting time points (e.g., transmission starting symbols). For example, when a subframe is composed of 4 symbols and an arbitrary symbol among the 4 symbols is configurable as a transmission starting time point, a frequency spreading sequence for each transmission starting time point may be configured as shown in Table 1 below.

TABLE 1

| Transmission starting time point | Length of spreading sequence (length of 4) |
|---|---|
| Symbol #0 | [1, 1, 1, 1] |
| Symbol #1 | [1, −1, 1, −1] |
| Symbol #2 | [1, 1, −1, −1] |
| Symbol #3 | [1, −1, −1, 1] |

Therefore, if the transmission starting time point of the terminal #1 is equal to the transmission starting time point of the terminal #2, the frequency spreading sequence used by the terminal #1 may be the same as the frequency spreading sequence used by the terminal #2. In this case, the terminals #1 and #2 may be distinguished by different time spreading sequences. Nt orthogonal time spreading sequences may be used to distinguish Nt terminals. When Nf orthogonal frequency spreading sequences are used to distinguish between Nt different transmission start time points, the minimum number of Nf may be Nt. When Nf is greater than Nt, a plurality of orthogonal frequency spreading sequences may be mapped to the same transmission starting time point. For example, the frequency spreading sequence for each transmission starting time point may be configured as shown in Table 2 below.

TABLE 2

| Transmission starting time point | Length of spreading sequence (length of 8) |
|---|---|
| Symbol #0 | [1, 1, 1, 1, 1, 1, 1, 1], [1, 1, 1, 1, −1, −1, −1, −1] |
| Symbol #1 | [1, 1, −1, −1, −1, −1, 1, 1], [1, 1, −1, −1, 1, 1, −1, −1] |
| Symbol #2 | [1, −1, −1, 1, 1, −1, −1, 1], [1, −1, −1, 1, 1, −1, 1, −1] |
| Symbol #3 | [1, −1, 1, −1, −1, 1, −1, 1], [1, −1, 1, −1, 1, −1, 1, −1] |

Also, the base station may configure time spreading sequences used for one-dimensional spreading in the time axis (S702). In the step S702, a time spreading sequence #1 for the terminal #1 and a time spreading sequence #2 for the terminal #2 may be configured, and the time spreading sequence #1 may be orthogonal to the time spreading sequence #2. The base station may inform the terminal #1 of the frequency spreading sequence (e.g., the frequency spreading sequence described in Table 1 or Table 2) and the time spreading sequence #1 (S703), and may inform the terminal #2 of the frequency spreading sequence (e.g., the frequency spreading sequence described in Table 1 or Table 2) and the time spreading sequence #2 (S704). For example, the time and frequency spreading sequences (e.g., a spreading sequence pair) may be notified to the terminal through system information, a DCI, or a signaling message (e.g., RRC signaling message).

The terminal #1 may obtain the frequency spreading sequence and the time spreading sequence #1 from the base station. The terminal #1 may perform frequency-axis spreading based on the frequency spreading sequence and time-axis spreading based on the time spreading sequence #1 in order to transmit a TB #1 (S705-1). For example, when the frequency spreading sequence shown in Table 1 is used and a transmission starting time point of the TB #1 is set to the symbol #0, a spread signal (e.g., spread TB #1) for the TB #1 may be generated based on the frequency spreading sequence [1,1,1,1]. Alternatively, when the frequency spreading sequence shown in Table 1 is used and a transmission starting time point of the TB #1 is set to the symbol #2, a spread signal (e.g., spread TB #1) for the TB #1 may be generated based on the frequency spreading sequence [1,1,−1,−1].

The terminal #2 may obtain the frequency spreading sequence and the time spreading sequence #2 from the base station. The terminal #2 may perform frequency-axis spreading based on the frequency spreading sequence and time-axis spreading based on the time spreading sequence #2 in order to transmit a TB #2 (S705-2). For example, when the frequency spreading sequence shown in Table 1 is used and a transmission starting time point of the TB #2 is set to the symbol #1, a spread signal (e.g., spread TB #2) for the TB #2 may be generated based on the frequency spreading sequence [1,−1,1,−1]. Alternatively, when the frequency spreading sequence shown in Table 1 is used and a transmission starting time point of the TB #1 is set to the symbol #3, a spread signal (e.g., spread TB #2) for the TB #2 may be generated based on the frequency spreading sequence [1,−1,−1,1].

The terminal #1 may transmit the signal (e.g., the spread TB #1) to base station using the time-frequency resource #1 (S706-1), and the terminal #2 may transmit the signal (e.g., the spread TB #2) to base station using the time-frequency resource #2 (S706-2). Here, the time-frequency resource #1 may be partially or entirely overlapped with the time-frequency resource #2.

The base station may receive the signal (e.g., the spread TB #1) through the time-frequency resource #1 and the signal (e.g., the spread TB #2) through the time-frequency resource #2. The base station may perform despreading based on the frequency spreading sequence to distinguish the TB #1 and the TB #2 (S707). For example, the base station may perform despreading based on the frequency spreading sequence [1, 1, 1, 1] of Table 1 to identify the TBs whose transmission starting time points are the symbol #0 in the subframe, and may perform dispreading based on the frequency spreading sequence [1, −1, 1, −1] of Table 1 to identify the TBs whose transmission starting time point is the symbol #1 in the subframe. Also, the base station may perform despreading based on the frequency spreading sequence [1, 1, −1, −1] of Table 1 to identify the TBs whose transmission starting time point is the symbol #2 in the subframe, and may perform despreading based on the frequency spreading sequence [1, −1, −1, 1] of Table 1 to identify the TBs whose transmission starting time point is the symbol #3 in the subframe.

When the transmission starting time point of the TB #1 is different from the transmission starting time point of the TB #2, the base station may distinguish the TB #1 and the TB #2 using the frequency spreading sequence, and may obtain a packet by performing decoding on each of the identified TB #1 and TB #2. On the other hand, when the transmission starting time point of the TB #1 is equal to the transmission starting time point of the TB #2, since the TB #1 and the TB #2 are not distinguished by the frequency spreading sequence, the terminal may distinguish the TB #1 and the TB #2 by using the time spreading sequence.

For example, when the step S707 is completed, the base station may perform a time spreading sequence-based despreading to distinguish the TB #1 and the TB #2 (S708). In the step S708, the base station may obtain the TB #1 by performing despreading based on the time spreading sequence #1, and may obtain the TB #2 by performing despreading based on the time spreading sequence #2.

Meanwhile, in the communication system supporting ultra-reliability and low-latency requirements, a short-length packet may be used. From a viewpoint of maximizing a channel coding gain, it may be preferable that time resources are used to increase a length of a codeword obtained as a result of channel coding rather than time-axis spreading. On the other hand, it may be desirable to use frequency-axis spreading because interferences from other terminals or cells can be averaged when the frequency-axis spreading is used.

For example, when a frequency spreading sequence having a length of Nf is applied to each of Mf modulated symbols in the frequency axis, Mf×Nf resource elements (REs) may be used in the frequency axis. Since Nf terminals can use the same resource, a terminal multiplexing capacity according to the frequency axis spreading may be the same regardless of whether the frequency axis spreading is applied or not. In order to maintain the orthogonality between the terminals, spread symbols resulting from spreading may desirably occupy neighboring REs within a symbol group unit per spreading unit in the frequency axis. On the other hand, in order to obtain a frequency diversity effect, REs for a symbol group unit per spreading unit may be widely distributed in the frequency axis.

In order to transmit or receive very short information (e.g., a few bits), the time-frequency spreading-based transmission scheme may be used. For example, the very short information may be an HARQ response (e.g., ACK or NACK). In this case, the time-axis spreading may be performed within a time range allowed by the low latency requirement. Even in this case, it may be desirable to obtain the orthogonality maintaining effect and the frequency diversity effect between the terminals by using the frequency-axis spreading.

Continuous Transmission Scheme

Figure 8:
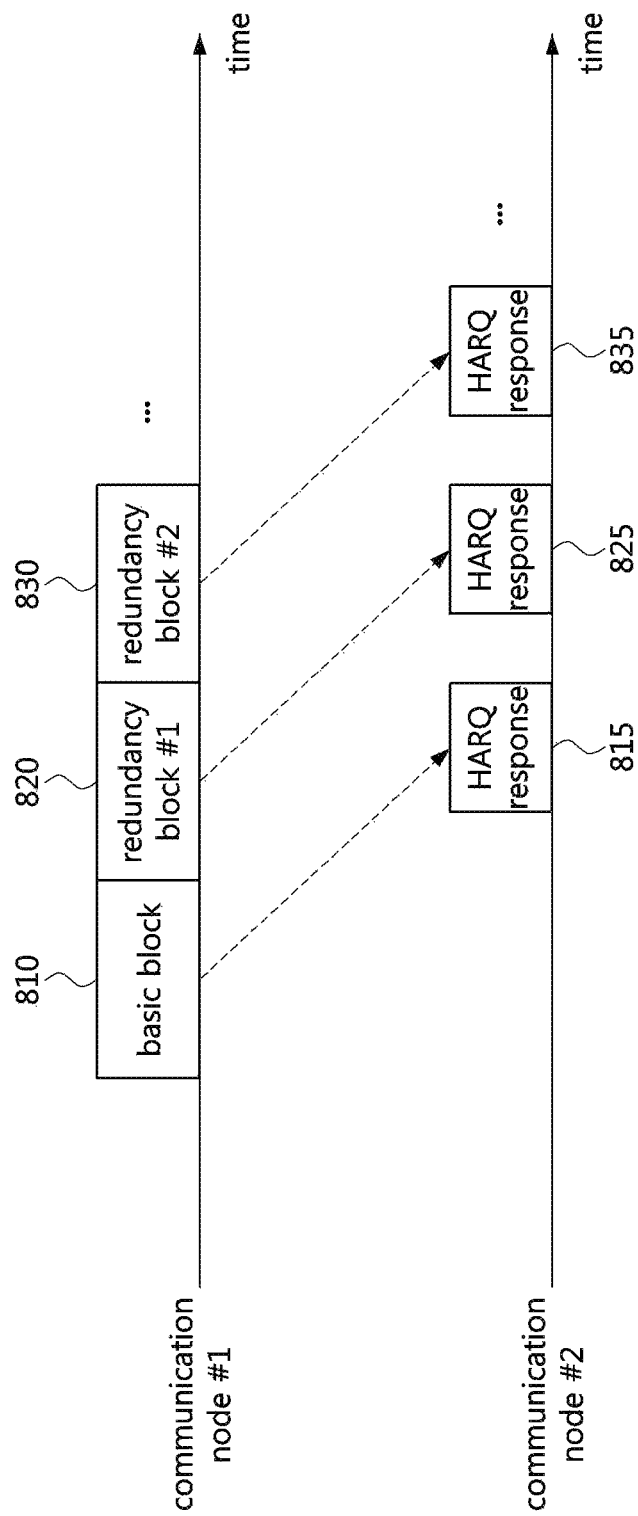
FIG. 8 is a timing diagram illustrating a first embodiment of a continuous transmission scheme in a communication system.

FIG. 8 is a timing diagram illustrating a first embodiment of a continuous transmission scheme in a communication system.

Referring to FIG. 8, a communication system may include a communication node #1, a communication node #2, and the like. Each of the communication node #1 and the communication node #2 may be a base station, a terminal, or the like. Each of the communication nodes #1 and #2 may be configured to be the same as or similar to the communication node 200 shown in FIG. 2. Here, a subframe may include 8 symbols (e.g., OFDM symbols). However, the number of symbols constituting the subframe may vary. For example, the number of symbols constituting the subframe may be 4, 5, 12, 14, or the like.

The communication node #1 may transmit a basic block 810 to the communication node #2. The basic block 810 may be transmitted based on the frequency spreading-based transmission scheme, the time spreading-based transmission scheme, or the time-frequency spreading-based transmission scheme described above. A transmission starting time point of the basic block 810 may be an arbitrary symbol among the symbols constituting the subframe, and the length of the basic block 810 may correspond to the length of one subframe. The basic block 810 may correspond to an initial transmission TB and may include data and a cyclic redundancy check (CRC) value. Also, the receiving communication node (e.g., the communication node #2) may decode the basic block 810 by using only the basic block 810. For example, the basic block 810 may be a complete codeword.

The communication node #1 may transmit redundancy blocks 820 and 830 to the communication node #2 in succession to the basic block 810. The redundancy blocks 820 and 830 may be transmitted based on the frequency spreading-based transmission scheme, the time spreading-based transmission scheme, or the time-frequency spreading-based transmission scheme described above. Each of the redundancy blocks 820 and 830 may correspond to a retransmission TB for the basic block 810. In the receiving communication node (e.g., communication node #2), the redundancy block 820 or 830 may be decoded through combining with the basic block 810. In this case, each of the redundancy blocks 820 and 830 may include additional bits for supporting decoding of the codeword included in the basic block 810. Alternatively, the receiving communication node (e.g., the communication node #2) may decode the redundancy block 820 or 830 by using only the redundancy block 820 or 830.

The communication node #2 may preferentially detect a time range of the basic block 810 in order to receive the basic block 810. The communication node #2 may detect a transmission starting time point of the basic block 810 when the communication node #2 knows the time range of the basic block 810 in advance. When the basic block 810 is transmitted using a frequency band and a spreading sequence preconfigured for each communication node, the communication node #2 may perform a blind detection operation to monitor whether the detected basic block 810 is a basic block for the communication node #2, and when the detected basic block 810 is a basic block for the communication node #2, the communication node #2 may detect a starting symbol location of the basic block 810, which corresponds to the transmission starting time point.

For example, the communication node #2 may perform channel estimation for the basic block 810, and may decode the basic block 810 based on a result of the channel estimation. When the decoding of the basic block 810 fails, the communication node #2 may transmit a NACK 815 to the communication node #1 by using an HARQ response resource corresponding to the basic block 810, and may perform decoding by using the basic block 810 and the redundancy block 820. When the decoding based on the basic block 810 and the redundancy block 820 fails, the communication node #2 may transmit a NACK 825 to the communication node #1 by using an HARQ response resource corresponding to the redundancy block 820, and may perform decoding by using the basic block 810, the redundancy block 820, and the redundancy block 830. When the decoding based on the basic block 810 and the redundancy blocks 820 and 830 succeeds, the communication node #2 may transmit an ACK 835 to the communication node #1 by using an HARQ response resource corresponding to the redundancy block 830.

Meanwhile, resource locations of the blocks (e.g., the basic block 810, the redundancy blocks 820 and 830) transmitted from the communication node #1 may have preconfigured relationship with resource locations of the HARQ responses 815, 825 and 835 transmitted from the communication node #2. In this case, the communication node #1 may receive the HARQ responses 815, 825, and 835 from the communication node #2 by monitoring resources according to the preconfigured relationship. When a NACK is received as the HARQ response, the communication node #1 may determine that a TB has not been successfully received as a result of the transmission from the communication node #2 up to the corresponding block. On the other hand, when an ACK is received as the HARQ response, the communication node #1 may determine that a TB has been successfully received as a result of the transmission from the communication node #2 up to the corresponding block. In this case, the communication node #1 may stop transmission of additional redundancy blocks.

Method for Controlling Frequency Resource Uses and Interferences

When D2D communications are performed, interferences between communication nodes participating in the D2D communications may increase. For example, when a time-frequency resource used by the communication node #1 transmitting a first signal is equal to a time-frequency resource used by the communication node #2 receiving a second signal, since the signal of the communication node #1 acts as a very large interference in the communication node #2, it may be difficult for the communication node #2 to receive the second signal successfully. It is therefore desirable that neighboring communication nodes do not perform transmission and reception using the same time-frequency resource.

For interference control, the communication nodes may be classified into a sensor group and an actuator group. Also, a specific communication node may belong to both the sensor group and the actuator group. Here, the communication node may be a base station, a terminal, or the like. A communication node belonging to the sensor group may transmit a signal to a communication node belonging to the actuator group, and a communication node belonging to the actuator group may transmit a signal to a communication node belonging to the sensor group. However, communication nodes belonging to the same group may not be able to transmit and receive signals to and from each other. Time-frequency resources configured for the sensor group and the actuator group may be as follows.

Figure 9:
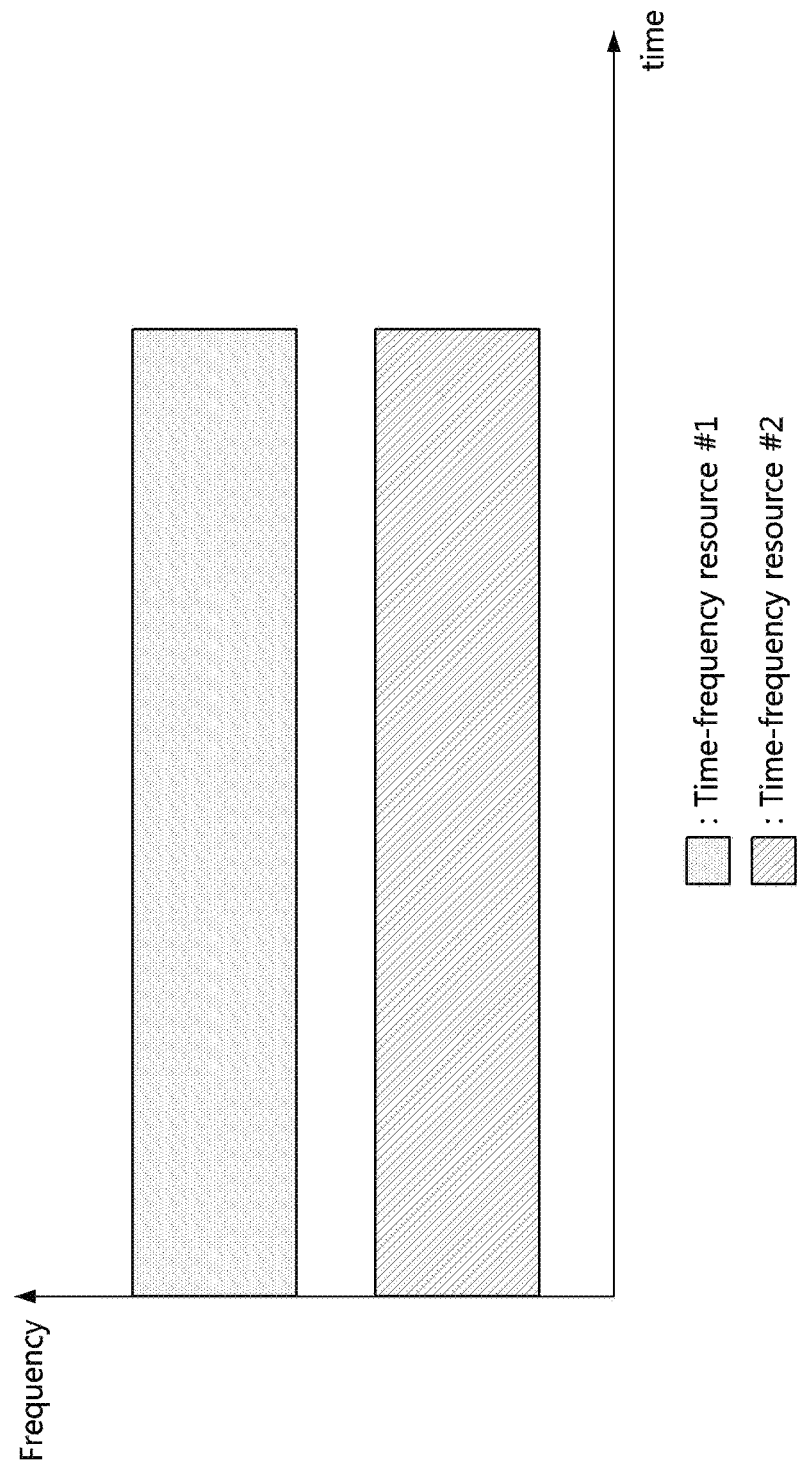
FIG. 9 is a conceptual diagram illustrating a fourth embodiment of time-frequency resources used for communications in a communication system.

FIG. 9 is a conceptual diagram illustrating a fourth embodiment of time-frequency resources used for communications in a communication system.

Referring to FIG. 9, a communication node belonging to the sensor group may be located adjacent to a communication node belonging to the actuator group. In this case, a signal transmitted by the communication node belonging to the sensor group may act as interferences for the communication node belonging to the actuator group, and a signal transmitted by the communication node belonging to the actuator group may act as interferences for the communication node belonging to the sensor group. In order to such the problem, a time-frequency resource #1 for the communication node belonging to the sensor group may be configured to be different from a time-frequency resource #2 for the communication node belonging to the actuator group.

For example, the time-frequency resource #1 may be a time-frequency resource used for signal transmission of the communication node belonging to the sensor group, and the time-frequency resource #2 may be a time-frequency resource used for signal transmission of the communication node belonging to the actuator group. A certain frequency interval (e.g., a guard frequency band) may be configured between the time-frequency resource #1 and the time-frequency resource #2. Also, the time-frequency resources for the sensor group and the actuator group may be configured based on a frequency division multiplexing (FDM) scheme rather than a time division multiplexing (TDM) scheme, which is more advantageous in satisfying the low-latency requirement.

Meanwhile, a communication scenario in which a communication node belonging to a sensor group transmits a signal to a communication node belonging to an actuator group may be as follows.

Figure 10:
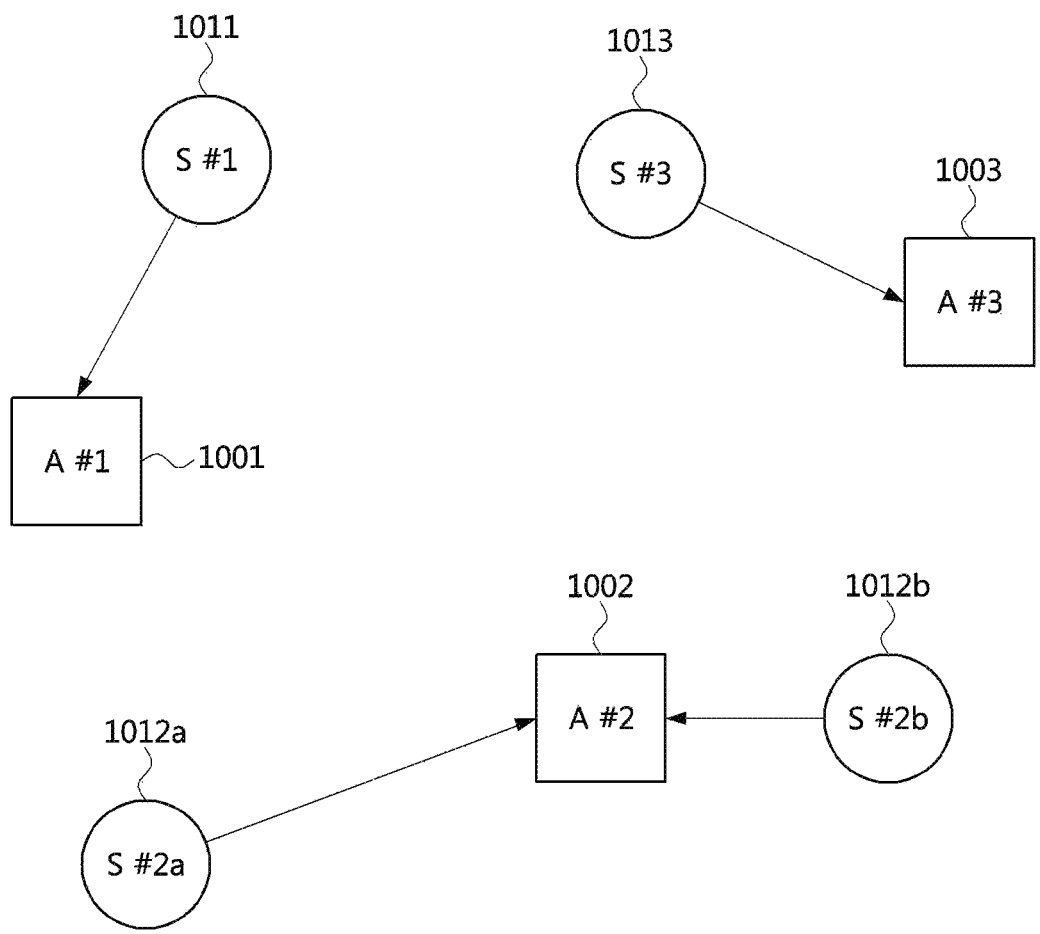
FIG. 10 is a conceptual diagram illustrating a first embodiment of a communication scenario between a sensor group and an actuator group in a communication system.

FIG. 10 is a conceptual diagram illustrating a first embodiment of a communication scenario between a sensor group and an actuator group in a communication system.

Referring to FIG. 10, a communication system may include communication nodes belonging to a sensor group and communication nodes belonging to an actuator group. Nodes S #1 (denoted as 1011), S #2a (denoted as 1012a), S #2b (denoted as 1012b), and S #3 (denoted as 1013) may be communication nodes belonging to the sensor group, and nodes A #1 (denoted as 1001), A #2 (denoted as 1002), and A #3 (denoted as 1003) may be communication nodes belonging to the actuator group. Interferences may occur when communication between the communication nodes is performed using the same time-frequency resources. In order to solve such the problem, an orthogonal time-frequency resource may be allocated to each of the communication nodes (e.g., S #1, S #2a, S #2b and S #3) belonging to the sensor group. For example, the time-frequency resources for S #1, S #2a, S #2b and S #3 may not overlap each other. However, if necessary, the time-frequency resources for the communication nodes belonging to the sensor group may be configured to overlap. In this case, an orthogonal sequence (e.g., an orthogonal spreading sequence) may be allocated to each of the communication nodes having the overlapped time-frequency resources.

Each of the communication nodes (e.g., S #1, S #2a, S #2b, and S #3) belonging to the sensor group may transmit a reference signal using the pre-allocated time-frequency resource. The reference signal may be periodically transmitted, and a transmission power of the reference signal may have a constant relationship with a transmission power of data. The communication nodes (e.g., A #1, A #2 and A #3) may receive the reference signals from the communication nodes (e.g., S #1, S #2a, S #2b, and S #3) belonging to the sensor group, estimate channels based on the received reference signals, and measure interferences and noises based on the received reference signals.

Sequence-Based Interference/Noise Measurement Method

When the communication nodes (e.g., S #1, S #2a, S #2b, and S #3) belonging to the sensor group use the same time-frequency resources to satisfy the ultra-reliability and low-latency requirements, the communication nodes (e.g., A #1, A #2 and A #3) belonging to the actuator group may measure an effective SINR under the assumption that interferences due to use of the same time-frequency resources exist. In order to support the effective SINR measurement, all the communication nodes (e.g., S #1, S #2a, S #2b and S #3) belonging to the sensor group may transmit reference signals using the same time-frequency resources.

Further, a spreading sequence applied to the reference signal transmitted by S #2a may be orthogonal to a spreading sequence applied to the reference signal transmitted by S #2b, and S #2a and S #2b may use the same scrambling sequence. For example, the orthogonal spreading sequences allocated to S #2a and S #2b may be as shown in Table 3 below.

TABLE 3

| Communication node | Length of spreading sequence (length of 4) |
|---|---|
| S #2a | [1, 1, 1, 1] |
| S #2b | [1, −1, 1, −1] |
| — | [1, 1, −1, −1] |
| — | [1, −1, −1, 1] |

Further, a spreading sequence for A #2 may be allocated, and the spreading sequence for A #2 may be orthogonal to each of the spreading sequences for S #2a and S #2b. For example, when the spreading sequence for S #2a is [1, 1, 1, 1] and the spreading sequence for S #2b is [1, −1, 1, −1], the spreading sequence for A #2 may be configured to [1, 1, −1, −1] or [1, −1, −1, 1].

However, the spreading sequence applied to the reference signal transmitted by S #2a may be non-orthogonal to the spreading sequence applied to the reference signal transmitted by each of S #1 and S #3, and the spreading sequence applied to the reference signal transmitted by S #2b may be non-orthogonal to the spreading sequence applied to the reference signal transmitted by each of S #1 and S #3. From a viewpoint of reception at A #2, signals transmitted from S #1 and S #3 may act as interferences.

In the communication scenario shown in FIG. 10, an interference and noise measurement method performed by A #2 may be as follows.

FIG. 11 is a conceptual diagram illustrating a first embodiment of an interference/noise measurement method in a communication system.

Referring to FIG. 11, the communication nodes (e.g., S #1, S #2a, S #2b and S #3) belonging to the sensor group may use the same time-frequency resources to transmit signals (e.g., reference signals, control information, and data). A #2 may receive the signals of the communication nodes (e.g., S #1, S #2a, S #2b and S #3) belonging to the sensor group through the same time-frequency resources, and may perform despreading on the received signals by using the spreading sequence of A #2. When the despreading operation is performed, since the spreading sequence for A #2 is orthogonal to the spreading sequences for S #2a and S #2b, signals of S #2a and S #2b may be removed. Therefore, when the despreading operation is completed, only the signals (e.g., signals of S #1 and S #3) acting as interferences for A #2 may remain, and A #2 may measure the interferences caused by S #1 and S #3 based on the remaining signals. Since the interferences measured by the despreading operation are represented by a sum of the demodulated symbols, the magnitude of the interferences may be changed according to a phase relationship between the demodulated symbols. A #2 may perform the above-described interference measurement method repeatedly on a plurality of samples, and estimate an average of the repeatedly performed results as an average interference amount.

Sequence-Based Signal Strength Measurement Method

In order to accurately measure a signal strength, a reception quality of the reference signal should be ensured. To this end, it is necessary to minimize interference between communication nodes. For example, it is desirable that the communication nodes (e.g., S #1, S #2a, S #2b, and S #3) belonging to the sensor group use different time-frequency resources to transmit the reference signals (or, data). Alternatively, when the same time-frequency resource is allocated for transmission of the reference signals (or data), it is desirable that the communication nodes (e.g., S #1, S #2a, S #2b, and S #3) transmit the reference signals (or data) based on different spreading sequences.

In case that each of S #2a and S #2b use the same time-frequency resource and the spreading sequences allocated to S #2a and S #2b are orthogonal as shown in Table 3, the signal strength for each of S #2a and S #2b may be measured as follows.

FIG. 12 is a conceptual diagram illustrating a first embodiment of a signal strength measurement method in a communication system.

Referring to FIG. 12, S #2a and S #2b may transmit signals (e.g., reference signals, control information, or data) using the same time-frequency resource. A #2 may receive the signal of S #2a and the signal of S #2b through the same time-frequency resource, and may perform despreading on the received signals using the spreading sequence of S #2a. When the despreading operation is performed, since the spreading sequence of S #2b is orthogonal to the spreading sequence of S #2a, the signal of S #2b may be removed. Accordingly, when the despreading operation is completed, only the signal of S #2a may remain, and A #2 may measure the received signal strength of S #2a based on the remaining signal.

Figure 13:
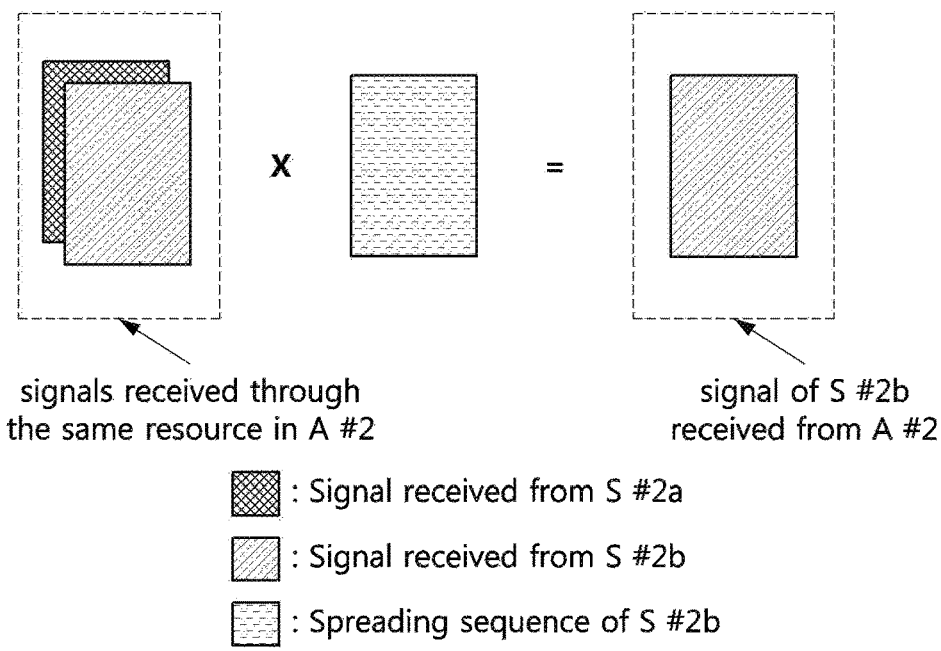
FIG. 13 is a conceptual diagram illustrating a third embodiment of a signal strength measurement method in a communication system.

FIG. 13 is a conceptual diagram illustrating a third embodiment of a signal strength measurement method in a communication system.

Referring to FIG. 13, S #2a and S #2b may transmit signals (e.g., reference signals, control information, or data) using the same time-frequency resource. A #2 may receive the signal of S #2a and the signal of S #2b through the same time-frequency resource, and may perform despreading on the received signals using the spreading sequence of S #2b. When the despreading operation is performed, since the spreading sequence of S #2b is orthogonal to the spreading sequence of S #2a, the signal of S #2a may be removed. Accordingly, when the despreading operation is completed, only the signal of S #2b may remain, and A #2 may measure the received signal strength of S #2b based on the remaining signal.

Link Adaptation

In the above-described embodiments, communications may be performed based on a grant-free scheme. The transmitting communication node may perform link adaptation based on a target block error rate (BLER) and a minimum latency requirement of a packet. For the link adaptation, the receiving communication node may estimate channel quality information (CQI) for a radio channel between the transmitting communication node and the receiving communication node. For example, the receiving communication node may estimate the radio channel based on a reference signal received from the transmitting communication node, estimate interferences and noises based on the estimated radio channel, and estimate an effective SINR for a resource block based on the estimated interferences and noises. The receiving communication node may inform the transmitting communication node or a primary communication node of the estimated CQI (e.g., the effective SINR). The transmitting communication node or the primary communication node may perform the link adaptation based on the CQI.

For example, based on the effective SINR obtained from the receiving communication node, the primary communication node may determine a transmission power, a MCS level, a transport block size (TBS), and a resource for achieving a target BLER and a minimum latency requirement for a transport block having a predefined size, and inform the transmitting communication node of the determined transmission power, MCS level, TBS, and resource. The transmitting communication node may transmit a signal to the receiving communication node using the transmission power, MCS level, TBS, and resource determined by the primary communication node.

However, the above-described embodiments may be unsuitable for efficiently controlling the transmission power of the communication nodes belonging to the sensor group. In order to apply an operation of reducing interference when the interference is large and an operation of increasing an intensity of a signal when the intensity of the signal is small, there is a need for a method for individually identify the magnitude of the interference and the intensity of the signal.

Figure 14:
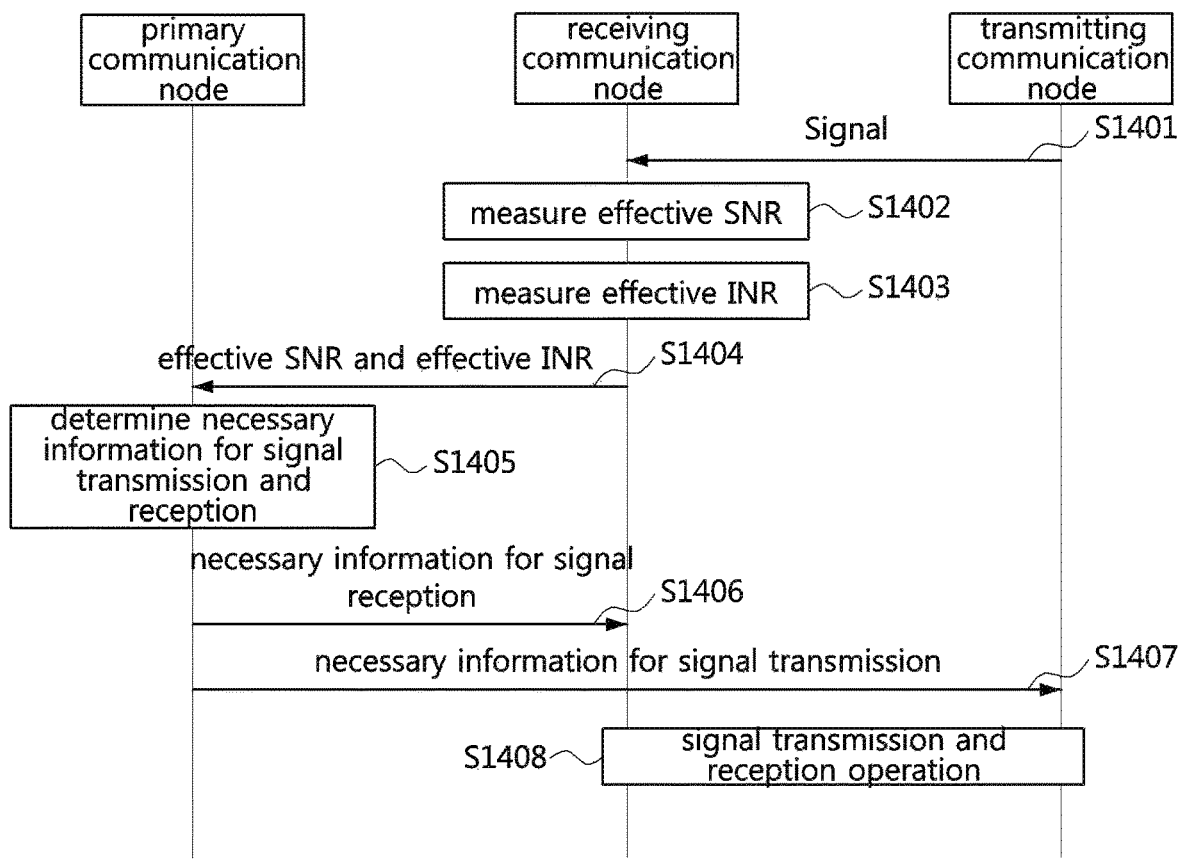
FIG. 14 is a sequence chart illustrating a first embodiment of a link adaptation method in a communication system.

FIG. 14 is a sequence chart illustrating a first embodiment of a link adaptation method in a communication system.

Referring to FIG. 14, a communication system may include a primary communication node, a transmitting communication node, a receiving communication node, and the like. Each of the primary communication node, the transmitting communication node, and the receiving communication node may be a base station, a terminal, or the like. The transmitting communication node may be a communication node belonging to the sensor group, and the receiving communication node may be a communication node belonging to the actuator group.

The transmitting communication node may transmit a signal (e.g., reference signal, control information, data, etc.) to the receiving communication node (S1401). The signal transmitted in the step S1401 may be a signal used to measure an effective SNR and an effective interference-to-noise ratio (INR). A resource for measuring the effective SNR (hereinafter referred to as 'effective SNR measurement resource') may be configured separately from a resource for measuring the effective INR (hereinafter referred to as 'effective INR measurement resource'). In order to consider various interference scenarios, the effective INR measurement resource for each of a plurality of interference scenarios may be configured. The effective SNR measurement resource and the effective INR measurement resource may be configured by the primary communication node, and the primary communication node may transmit information of the effective SNR measurement resource and information of the effective INR measurement resource to each of the transmitting communication node and the receiving communication node. In this case, the signal of the step S1401 may be transmitted through the effective SNR measurement resource and the effective INR measurement resource.

The receiving communication node may receive the signal by monitoring the effective SNR measurement resource and the effective INR measurement resource. The receiving communication node may measure the effective SNR using the signal received through the effective SNR measurement resource (S1402). Also, the receiving communication node may measure the effective INR using the signal received through the effective INR measurement resource (S1403). When a plurality of effective INR measurement resources (e.g., effective INR measurement resources for a plurality of interference scenarios) are configured, the receiving communication node may measure the effective INR in each of the plurality of effective INR measurement resources. The receiving communication node may report the effective SNR and the effective INR to the primary communication node (S1404).

The primary communication node may receive the effective SNR and the effective INR from the receiving communication node, and may calculate the effective SINR based on the effective SNR and the effective INR. The effective SINR may be calculated based on Equation 5 below.

$$SINR^{\mathit{eff}} = \frac{SNR^{\mathit{eff}}}{1 + INR^{\mathit{eff}}} \quad \text{[Equation 5]}$$

In Equation 5, $SINR^{\mathit{eff}}$ may indicate the effective SINR, $SNR^{\mathit{eff}}$ may indicate the effective SNR obtained from the receiving communication node, and $INR^{\mathit{eff}}$ may indicate the effective INR obtained from the receiving communication node. The primary communication node may determine information (e.g., transmission power, MCS level, TBS, resource, etc.) necessary for signal transmission and reception considering the effective SINR, effective SNR, effective INR, target BLER, and minimum latency requirement (S1405). The primary communication node may transmit to the receiving communication node the information (e.g., transmission power, MCS level, TBS, resource, etc.) necessary for signal reception (S1406), and transmit to the transmitting node the information (e.g., transmission power, MCS level, TBS, resource, etc.) necessary for signal transmission (S1407).

In a step S1408, the transmitting communication node may transmit a signal to the receiving communication node based on the information (e.g., transmission power, MCS level, TBS, resource, etc.) received from the primary communication node, and the receiving communication node may receive the signal from the transmitting communication node based on the information (e.g., transmission power, MCS level, TBS, resource, etc.) received from the primary communication node.

Problem of Applying Short-Term CSI Based Scheduling for Each Subband

When a resource is allocated using a short-term CSI of a subband, the link performance may be maximized through a frequency domain scheduling scheme, an antenna selection scheme, and a beamforming scheme. However, when a signal is transmitted using a preallocated resource in a grant-free communication scheme, it may be difficult to apply the frequency domain scheduling scheme using a frequency resource having a high channel gain.

Therefore, it is preferable that a frequency resource allocated based on a long-term CSI is used. On the other hand, the antenna selection scheme and the beamforming scheme are applicable when the CSI for the preallocated resource is received from the receiving communication node. In order to use an optimal antenna or beam, the CSI of the channel may be required at a transmission time point of the transmitting communication node. However, since information on the transmission time point of the transmitting communication node is not notified in advance, a latency of a processing time for selecting an optimal antenna or beam based on the CSI may occur. As a result, ultra-reliability and low-latency requirements may not be satisfied.

It is preferable that a frequency band used for communication is preconfigure and link adaptation is performed based on a CSI for the preconfigured frequency band. To this end, the primary communication node may receive the long-term CSI from the receiving communication node, perform scheduling based on the long-term CSI, and inform the transmitting communication node and the receiving communication node of scheduling information determined based on the long-term CSI. The transmitting communication node may transmit a signal based on the long-term CSI-based scheduling information received from the primary communication node, and the receiving communication node may receive the signal based on the long-term CSI-based scheduling information received from the primary communication node. If a change of the effective channel is minimized by maximizing the diversity effect, the long-term CSI may be accurate CSI at the actual transmission time point of the transmitting communication node.

Maximization of Diversity Effect

It is necessary to overcome a fading of the radio channel as much as possible in order to satisfy the ultra-reliability requirement. A frequency diversity scheme and an antenna diversity scheme may be considered as a diversity scheme. In order to maximize the frequency diversity effect, a TB may be allocated to resources that are spaced more than a coherent length in the frequency axis. In order to maximize the antenna diversity effect, the transmitting communication node and the receiving communication node may use a plurality of antennas. For example, it is preferable that many antennas are used in the receiving communication node, which can obtain a processing gain. In order to maximize the antenna diversity effect, a correlation between the antennas should be small.

Control Information Transmission Method

A signal transmission scheme may be classified as follows according to the type of information to be transmitted.

Signal transmission scheme #1: Only control information is transmitted.
Signal transmission scheme #2: Only data is transmitted.
Signal transmission scheme #3: Data and control information are transmitted.

The control information may include information necessary for demodulating and decoding the data. For example, the control information may include a TBS, a packet length, an MCS level, and the like. When the signal transmission scheme #3 is used, the control information may take precedence over the data in the time axis. It is desirable that the receiving communication node know in advance a format of the control information (e.g., the size of the control information, configuration of each field included in the control information, and the like).

The transmitting communication node may use a plurality of formats of control information. In this case, the receiving communication node may perform a blind detection operation to detect a format of control information received from the transmitting communication node. For link adaptation for the control information, the size of resources available for one control information format may be configured variously. In this case, the receiving communication node may further perform blind detection on the size of resources used for transmission of the control information. The control information to which the link adaptation scheme is applied may be transmitted as follows.

Figure 15:
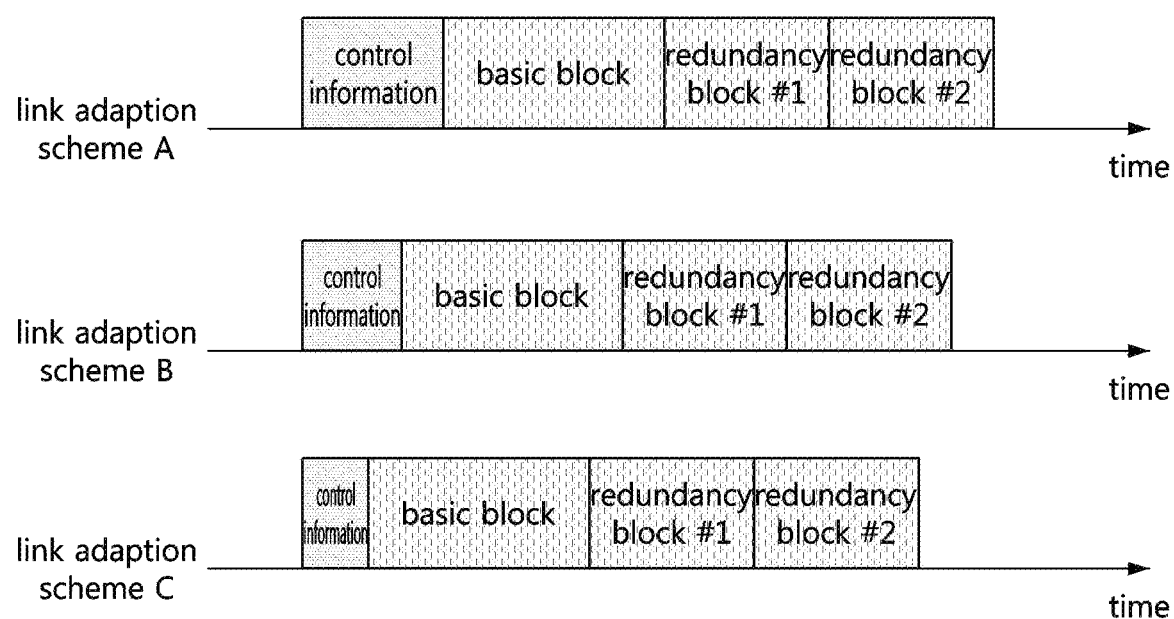
FIG. 15 is a timing diagram illustrating a first embodiment of a method of transmitting and receiving a signal based on a link adaptation scheme in a communication system.

FIG. 15 is a timing diagram illustrating a first embodiment of a method of transmitting and receiving a signal based on a link adaptation scheme in a communication system.

Referring to FIG. 15, the transmitting communication node may transmit a signal (e.g., control information and data) to the receiving communication node. In the time axis, the control information may take precedence over the data. The control information may include information necessary for demodulating and decoding the data (e.g., resource allocation information of a basic block, resource allocation information of a redundancy block, MCS level, etc.), and may be generated by a link adaptation scheme A, B or C. For example, three link adaptation schemes may be used for one control information format. The size of the resource to which the control information to which the link adaptation scheme A is applied is allocated, the size of the resource to which the control information to which the link adaptation scheme B is applied is allocated, and the size of the resource to which the control adaptation scheme to which the link adaptation scheme C is applied is allocated may be different from each other.

The receiving communication node may perform a blind detection operation because it does not know the link adaptation scheme used for transmission of the control information (e.g., the size of the resource to which the control information is allocated). That is, the receiving communication node may identify the link adaptation scheme (e.g., the size of the resource to which the control information is allocated) used for transmission of the control information by performing the blind detection operation, and may decode the control information based on the identified information. When the decoding of the control information is completed, the receiving communication node may receive the data (e.g., basic block, redundancy block) based on the information indicated by the control information.

Distinction Between Control Information Decoding Failure and Data Decoding Failure When the decoding of the control information fails, the receiving communication node may inform the transmitting communication node of the decoding failure of the control information. When the signal transmission scheme #3 is used, the receiving communication node may distinguish between the decoding failure of the control information and the decoding failure of the data, and may inform the transmitting communication node of it.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a base station in a communication system, the operation method comprising:
configuring a first frequency spreading sequence for a first transmission starting time point;
configuring a second frequency spreading sequence for a second transmission starting time point, the second transmission starting time point being different from the first transmission starting time point, and the second frequency spreading sequence being configured to be different from the first frequency spreading sequence;
configuring time spreading sequences each of which corresponds to a terminal; and
transmitting information on the first frequency spreading sequence, the second frequency spreading sequence, and the time spreading sequences to a plurality of terminals,
wherein the first frequency spreading sequence is used by a first terminal among the plurality of terminals when a transmission starting time point of the first terminal is the first transmission starting time point, the second frequency spreading sequence is used by the first terminal when the transmission starting time point of the first terminal is the second transmission starting time point, and both the first frequency spreading sequence and the second frequency spreading sequence are applied to same transport block (TB) of the first terminal, wherein each of the first and second transmission starting points is an arbitrary symbol in a subframe, and wherein the information on the first frequency spreading sequence, the second frequency spreading sequence, and the time spreading sequences is transmitted through system information, a radio resource control (RRC) signaling, or a downlink control information (DCI).

2. The operation method according to claim 1, wherein the first and second frequency spreading sequences are used for frequency-axis spreading.

3. The operation method according to claim 1, wherein the time spreading sequences are configured to be orthogonal to each other, and the time spreading sequences are used for time-axis spreading.

4. The operation method according to claim 1, further comprising:
receiving signals from the plurality of terminals through time-frequency resources; and
performing despreading on the signals by using the first frequency spreading sequence so as to obtain despread signals.

5. The operation method according to claim 4, further comprising, when the despread signals include a first signal of the first terminal and a second signal of a second terminal among the plurality of terminals, obtaining the first signal by performing despreading on the despread signals by using a first time spreading sequence for the first terminal, wherein the first time spreading sequence is orthogonal to a second time spreading sequence for the second terminal.

6. The operation method according to claim 5, wherein the first signal of the first terminal and the second signal of the second terminal are transmitted in a grant- free scheme.

7. The operation method according to claim 1, wherein a time-frequency resource through which the DCI is transmitted is allocated based on a link adaptation scheme, and the link adaptation scheme is determined based on a signal-to-noise ratio (SNR) and an interference-to-noise ratio (INR) which are obtained from at least one of the plurality of terminals.

8. An operation method of a first terminal in a communication system, the operation method comprising:
receiving, from a base station, information on a first frequency spreading sequence for a first transmission starting time point, a second frequency spreading sequence for a second transmission starting time point, and a first time spreading sequence, the second transmission starting time point being different from the first transmission starting time point, and the second frequency spreading sequence being configured to be different from the first frequency spreading sequence;
selecting the first frequency spreading sequence among the first and second frequency spreading sequences when a transmission starting time point of the first terminal is the first transmission starting time point, and selecting the second frequency spreading sequence when the transmission starting time point of the first terminal is the second transmission starting point;
generating a signal by performing spreading on a transport block (TB) based on the first time spreading sequence and the selected first frequency spreading sequence; and
transmitting the signal to the base station,
wherein each of the first and second transmission starting points is an arbitrary symbol in a subframe, and
wherein the information on the first frequency spreading sequence, the second frequency spreading sequence, and the time spreading sequences is transmitted through system information, a radio resource control (RRC) signaling, or a downlink control information (DCI).

9. The operation method according to claim 8, wherein the first and second frequency spreading sequences are used for frequency-axis spreading.

10. The operation method according to claim 8, wherein the first time spreading sequence is configured to be orthogonal to a time spreading sequence for another terminal, and the first time spreading sequence is used for time-axis spreading.

11. The operation method according to claim 8, wherein the signal is transmitted based on a grant-free scheme.

12. The operation method according to claim 8, wherein a time-frequency resource through which the DCI is transmitted is allocated by the base station based on a link adaptation scheme, and the link adaptation scheme is determined based on a signal-to-noise ratio (SNR) and an interference-to-noise ratio (INR) which are measured by the first terminal.

13. The operation method according to claim 12, wherein the time-frequency resource through which the DCI is transmitted is monitored through a blind detection operation.

14. A first terminal transmitting a signal in a communication system, the first terminal comprising a processor and a memory storing at least one instruction executed by the processor, wherein the at least one instruction is configured to:
receive, from a base station, information on a first frequency spreading sequence for a first transmission starting time point, a second frequency spreading sequence for a second transmission starting time point, and a first time spreading sequence, the second transmission starting time point being different from the first transmission starting time point, and the second frequency spreading sequence being configured to be different from the first frequency spreading sequence;
select the first frequency spreading sequence among the first and second frequency spreading sequences when a transmission starting time point of the first terminal is the first transmission starting time point, and select the second frequency spreading sequence when the transmission starting time point of the first terminal is the second transmission starting time point;
generate a signal by performing spreading on a transport block (TB) based on the first time spreading sequence and the selected first frequency spreading sequence; and
transmit the signal to the base station,
wherein each of the first and second transmission starting points is an arbitrary symbol in a subframe, and
wherein the information on the first frequency spreading sequence, the second frequency spreading sequence, and the time spreading sequences is transmitted through system information, a radio resource control (RRC) signaling, or a downlink control information (DCI).

15. The first terminal according to claim 14, wherein the first and second frequency spreading sequences are used for frequency-axis spreading.

16. The first terminal according to claim 14, wherein the first time spreading sequence is configured to be orthogonal to a time spreading sequence for another terminal, and the first time spreading sequence is used for time-axis spreading.

17. The first terminal according to claim 14, wherein a time-frequency resource through which the DCI is transmitted is allocated by the base station based on a link adaptation scheme, and the link adaptation scheme is determined based on a signal-to-noise ratio (SNR) and an interference-to-noise ratio (INR) which are measured by the first terminal.

18. The first terminal according to claim 14, wherein the time-frequency resource through which the DCI is transmitted is monitored through a blind detection operation.

* * * * *